(12) United States Patent
Kant et al.

(10) Patent No.: US 11,128,507 B2
(45) Date of Patent: Sep. 21, 2021

(54) METHOD AND ARRANGEMENT FOR SIGNAL DISTORTION MITIGATION

(71) Applicant: Telefonaktiebolaget LM Ericsson (publ), Stockholm (SE)

(72) Inventors: Shashi Kant, Vällingby (SE); Eric Nordström, Stockholm (SE); David Astely, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 107 days.

(21) Appl. No.: 16/484,785

(22) PCT Filed: Jun. 14, 2017

(86) PCT No.: PCT/SE2017/050635
§ 371 (c)(1),
(2) Date: Aug. 8, 2019

(87) PCT Pub. No.: WO2018/147775
PCT Pub. Date: Aug. 16, 2018

(65) Prior Publication Data
US 2020/0052945 A1 Feb. 13, 2020

Related U.S. Application Data

(60) Provisional application No. 62/456,203, filed on Feb. 8, 2017.

(51) Int. Cl.
*H04L 27/26* (2006.01)
*H04B 7/0456* (2017.01)
(Continued)

(52) U.S. Cl.
CPC ....... *H04L 27/2615* (2013.01); *H04B 7/0456* (2013.01); *H04L 25/03828* (2013.01); *H04L 27/2623* (2013.01); *H04L 5/0007* (2013.01)

(58) Field of Classification Search
CPC .......... H04L 27/2615; H04L 25/03828; H04L 27/2623; H04L 5/0007; H04L 27/2614;
(Continued)

(56) References Cited

U.S. PATENT DOCUMENTS 9,485,063 B2 * 11/2016 Shattil ................... H04L 27/265
9,641,372 B2 *  5/2017 Terry .................... H04L 27/265
(Continued)

OTHER PUBLICATIONS

Bao H., et al., "Perturbation-Assisted PAPR Reduction for Large-Scale MIMO-OFDM Systems via ADMM," downloaded from the Internet: https://arxiv.org/abs/1607.02681v1, Jul. 10, 2016, 9 pages.
(Continued)

*Primary Examiner* — Habte Mered
(74) *Attorney, Agent, or Firm* — Nicholson De Vos Webster & Elliott LLP

(57) ABSTRACT

A method for signal distortion mitigation in a communication device with at least one transmitter in a communication system, generating a signal for transmission for each of the at least one transmitter; performing Peak-to-Average Power Ratio (PAPR) reduction and spectrum shaping of each of the generated signal to provide a distorted signal for transmission; determining signal distortions of the distorted signals, and precoding the determined signal distortions. The method further generating a composite signal for transmission based on the precoded determined signal distortions and the generated signal for transmission, to provide a composite signal, and transmitting the composite signal to at least one receiving communication device, wherein the precoding enables mitigating the signal distortion impact on the at least one receiver.

16 Claims, 14 Drawing Sheets

(51) Int. Cl.
*H04L 25/03* (2006.01)
*H04L 5/00* (2006.01)

(58) Field of Classification Search
CPC ............ H04L 25/03343; H04B 7/0456; H04B 7/0615; H04B 7/0639
See application file for complete search history.

(56) References Cited

U.S. PATENT DOCUMENTS

| | | | |
|---|---|---|---|
| 9,768,842 B2* | 9/2017 | Shattil | H04L 27/148 |
| 2011/0110403 A1* | 5/2011 | Jongren | H04L 25/03343 375/219 |
| 2011/0228878 A1* | 9/2011 | Sorrentino | H04L 5/0007 375/295 |
| 2013/0044791 A1* | 2/2013 | Rimini | H04B 1/30 375/219 |
| 2014/0348254 A1* | 11/2014 | Lee | H04B 7/0426 375/267 |
| 2016/0226693 A1* | 8/2016 | Nordstrom | H04L 27/2623 |
| 2017/0026218 A1* | 1/2017 | Shattil | H04B 7/024 |
| 2017/0187560 A1* | 6/2017 | Ng | H03F 3/24 |
| 2020/0059871 A1* | 2/2020 | Ryu | H04W 76/27 |

OTHER PUBLICATIONS

Beek, "Sculpting the Multicarrier Spectrum: A Novel Projection Precoder," IEEE Communications Letters, Dec. 2009, vol. 13 (12), pp. 881-883.

Boyd S., et al., "Distributed Optimization and Statistical Learning via the Alternating Direction Method of Multipliers," 2010, Foundations and Trends® in Machine Learning, downloaded from the Internet: https://www.researchgate.net/publication/220416607, vol. 3 (1), Jan. 2011, pp. 1-122 (126 pages).

Dardari D., et al., "A Theoretical Characterization of Nonlinear Distortion Effects in OFDM Systems," IEEE Transactions on Communications, vol. 48 (10), Oct. 2000, pp. 1755-1764.

Dhillon I.S., et al., "Constructing Packings in Grassmannian Manifolds via Alternating Projection," 2008, Experimental Mathematics, vol. 17(1), Sep. 4, 2007, pp. 9-35.

International Search Report and Written Opinion for Application No. PCT/SE2017/050635, dated Oct. 19, 2017, 9 pages.

Iofedov I., et al., "Distortion Cancellation Precoding for OFDM-SDMA Downlink with Nonlinear Power Amplifiers," IEEE 26th International Symposium on Personal, Indoor and Mobile Radio Communications (PIMRC), IEEE 2015, Aug. 30, 2015, pp. 704-709.

Song J., et al., "Performance Analysis for OFDM Signals With Peak Cancellation," IEEE Transactions on Communications, Jan. 2016, vol. 64 (1), pp. 261-270.

Studer C., et al., "PAR-Aware Large-Scale Multi-User MIMO-OFDM Downlink," IEEE Journal on Selected Areas in Communications, Sep. 4, 2012, 11 pages.

Tom A., et al., "Suppressing Alignment: Joint PAPR and Out-of-Band Power Leakage Reduction for OFDM-Based Systems," IEEE Transactions on Communications, Mar. 2016, vol. 64 (3), pp. 1100-1109.

Ye K., et al., "Schubert Varieties and Distances Between Subspaces of Different Dimensions," Society for Industrial and Applied Mathematics (SIAM)—Journal on Matrix Analysis and Applications, 2016, vol. 37 (3), pp. 1176-1197.

International Preliminary Report on Patentability for Application No. PCT/SE2017/050635, dated Aug. 22, 2019, 9 pages.

3GPP TS 36.213 V14.2.0, "3rd Generation Partnership Project; Technical Specification Group Radio Access Network; Evolved Universal Terrestrial Radio Access (E-UTRA); Physical layer procedures (Release 14)," Mar. 2017, 454 pages.

3GPP TS 36.211 V14.1.0, "3rd Generation Partnership Project; Technical Specification Group Radio Access Network; Evolved Universal Terrestrial Radio Access (E-UTRA); Physical channels and modulation (Release 14)," Dec. 2016, 175 pages.

* cited by examiner

METHOD AND ARRANGEMENT FOR SIGNAL DISTORTION MITIGATION

CROSS-REFERENCE TO RELATED APPLICATIONS

This application is a National stage of International Application No. PCT/SE2017/050635, filed Jun. 14, 2017, which claims priority to U.S. Application No. 62/456,203, filed Feb. 8, 2017, which are hereby incorporated by reference.

TECHNICAL FIELD

The proposed technology generally relates to communication systems and in particular to methods and arrangements for transmitter crest factor reduction that mitigates the impact of the distortions at the receiver(s) in such systems.

BACKGROUND

The use of multiple antennas at both the transmitter and receiver, so called multiple-input multiple-output (MIMO) techniques, can be used to improve both performance of individual links as well as systems with multiple links in terms of user data rates, system capacity and coverage. The use of multiple antennas can increase the received signal power, suppress interference, provide diversity gain against fading, not only for reception but also for transmission and furthermore, allow for transmission of multiple parallel data carrying signal layers on the same time and frequency resources. For the case with single user MIMO, (SU-MIMO), a transmitter transmits multiple layers to a single receiving user equipped with multiple antennas for reception. For multi-user MIMO (MU-MIMO), the multiple layers are transmitted to multiple users. In the general case a combination of SU and MU MIMO is foreseen where the transmitter uses available knowledge about the radio channels and demands for transmission, selects a set of users to transmit to, for each user selects an appropriate number of signals, and finally pre-codes the signal layers appropriately, e.g., to avoid causing excessive interference among the layers at the receivers.

Multiple input multiple output (MIMO) techniques have been an integral part of the 3rd and 4th generation mobile systems, e.g., UTRA and E-UTRA Long term evolution (LTE). LTE supports (since Rel-10) supports up to eight layers downlink transmission to a single user; in later releases 13 and 14, feedback for up to 32 transmit antenna ports have been introduced, enabling higher data rates and system capacity through the use of single-user and multi-user MIMO techniques. Looking further, massive MIMO, with even higher number of antennas is foreseen to be one of the key enablers for 5G wireless radio access enhancing both uplink and downlink system coverage and capacity through the use of single-user and multi-user MIMO techniques. Massive MIMO is also known as very-large MIMO, full-dimension MIMO (FD-MIMO) or large-scale antenna array systems.

Orthogonal frequency division multiple access (OFDMA) based systems are attractive since they enable low-complexity receivers in frequency selective channels and are therefore suitable for MIMO techniques. At the same time, it is well-known that the transmitted signals have quite high peak-to-average-power ratio (PAPR). To improve the power-amplifier (PA) efficiency, PAPR can be reduced, e.g., allowing reduced power back-off. For this purpose, crest-factor reduction (CFR) techniques can be employed, e.g., (iterative) clipping and filtering as well as (iterative) pulse/peak cancellation (e.g., [7]), to reduce the PAPR while still fulfilling requirements on unwanted emissions imposed by a spectral emission mask (SEM). The aforementioned CFR however introduces distortions to the transmitted signal, and a commonly used measure for such distortion, which need not only to stem from CFR but also from other non-idealities in a transmitter, is error vector magnitude (EVM). Also, the more the PAPR is reduced, the higher are the level of distortions meaning that there is a tradeoff between the level of distortion and PAPR which in turn impacts the power amplifier efficiency and design. In FIG. 2, an example of how EVM depends on the PAPR is shown for illustration purposes. For example, if it is assumed that the transmitter is designed to handle a signal with a PAPR of 6 dB, but the modulation scheme requires an EVM of 3%, it is necessary to have a PAPR of 9 dB which may be handled by a back off of 3 dB.

Furthermore, the distortions contribute to noise and interference and will limit the achievable signal-to-interference-and-noise ratio (SINR) in the intended receivers. Higher order modulations as well as single-user and multi-user spatial multiplexing (SU and MU MIMO) need a relatively high SINR to offer benefits, not only in terms of peak user throughput but also to boost system capacity, and it follows that it is important to ensure that the distortions are low enough at the intended receivers to benefit such features.

A generic simplified model for an LTE DL transmitter baseband and radio architecture for digital beamforming, in which the current disclosure can be implemented, is illustrated in FIG. 1. As illustrated in the figure, digital channel filters precede CFR mainly for spectrum shaping (which can be performed together). The signals after CFR are then digitally pre-distorted, before digital-to-analogue conversion (DAC) and modulated for up conversion to the carrier frequency. In addition to CFR, which may be a major contributor to the EVM in the transmit radio chain, there are also contributions from the other functions/components in the transmit paths.

A basic solution to CFR in a MIMO transmitter is to do as illustrated in FIG. 1 and apply CFR for each transmit path separately. Such an approach to CFR does not take full advantage of the opportunities offered by multiple antennas. More specifically, the distortions tend to be aligned with signals to be transmitted to the intended receiver(s) leading to that the distortions experienced by the receivers are un-necessarily high. A consequence of this is that in order to benefit from higher order modulation or MIMO techniques which require high SINR at the receiver(s), the distortions need to be reduced, for example by backing off the transmit power which in turn degrades the PA efficiency.

Other approaches, as outlined in [1] as well as in [2] and references therein, exploit detailed knowledge of the radio channels between the transmitter and the receiver to solve an optimization problem: one approach is to pose a convex optimization problem that reduces PAPR of the signals, and jointly performs MU precoding and OFDM modulation. Another approach in [2] is to determine the PAPR reducing perturbations as distortions by solving an optimization problem where the distortions are constrained to belong to the null space of the channels so that the receiver(s) experience no self-interference due to distortions at all. One problem with these solutions is that they require detailed instantaneous channel knowledge of the channel at the transmitter. Such knowledge is not always available. For frequency division duplex (FDD) mode of operation, only (coarsely) quantized preferred precoding matrices are typically reported see for example LTE, where such reports include precoding matrix indicator (PMI), channel quality indicator (CQI), and rank indication (RI). For time division duplex (TDD) mode of operation, uplink and downlink transmissions occur at the same frequency, and by means of channel reciprocity, channel estimates in the uplink may in principle be representative of the downlink channel. However, such channel knowledge may also be absent if uplink and downlink transmissions do not occur within the coherence time of the radio channel and use different transmission frequencies and bandwidth. Also, the receiver may only use a subset of the antennas used for reception than for transmission.

Another problem is that there is no known solution for signals and channels that are to be broadcasted to multiple receivers with unknown radio channels.

Consequently, there is a need for a solution that overcomes some or all the aforementioned problems with known solutions so that the impact of the distortions experienced by the receivers is mitigated while unwanted emissions can be reduced and the PAPR per antenna can be reduced in order to improve the power amplifier efficiency.

SUMMARY

It is an object to provide methods and arrangements to alleviate the above described problems.

This and other objects are met by embodiments of the proposed technology.

According to a first aspect, the disclosure presents a method for signal distortion mitigation in a communication device with at least two transmitters in a communication system, which method comprises the steps of generating a signal for transmission for each at least one transmitter, performing PAPR reduction and spectrum shaping of each generated signal to provide a distorted signal for transmission. Further, the method comprises determining signal distortions of the provided distorted signals, precoding the determined signal distortions, and generating a composite signal for transmission based on the precoded determined signal distortions and the generated signal for transmission, to provide a composite signal. Finally, the method discloses transmitting the composite signal to at least one receiving communication device, wherein the precoding mitigates the signal distortion impact on the at least one receiver.

According to a second aspect, there is provided a communication device configured to generate a signal for transmission for each at least one transmitter, and to perform PAPR reduction and spectrum shaping of each generated signal to provide a distorted signal for transmission. Further, the communication device is configured to determine signal distortions of the provided distorted signal, pre-code the determined signal distortions and generate a composite signal for transmission based on the precoded determined signal distortions and the generated signal for transmission, to provide a composite signal. Finally, the device is configured to transmit the composite signal, to enable signal distortion mitigation in at least one receiving communication device, wherein the precoding enables mitigating the signal distortion impact on the receivers.

According to further aspects there is provided a computer program and a computer program carrier configured for providing the functionality of the first and second aspects.

Embodiments of the proposed technology enables/makes it possible to perform PAPR reduction in conjunction with spectral shaping of signal by precoding distortions without downlink channel knowledge whilst mitigating effects of distortions introduced by PAPR reduction and spectrum shaping at one or several receiver node(s).

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

ABBREVIATIONS

Figure 1:
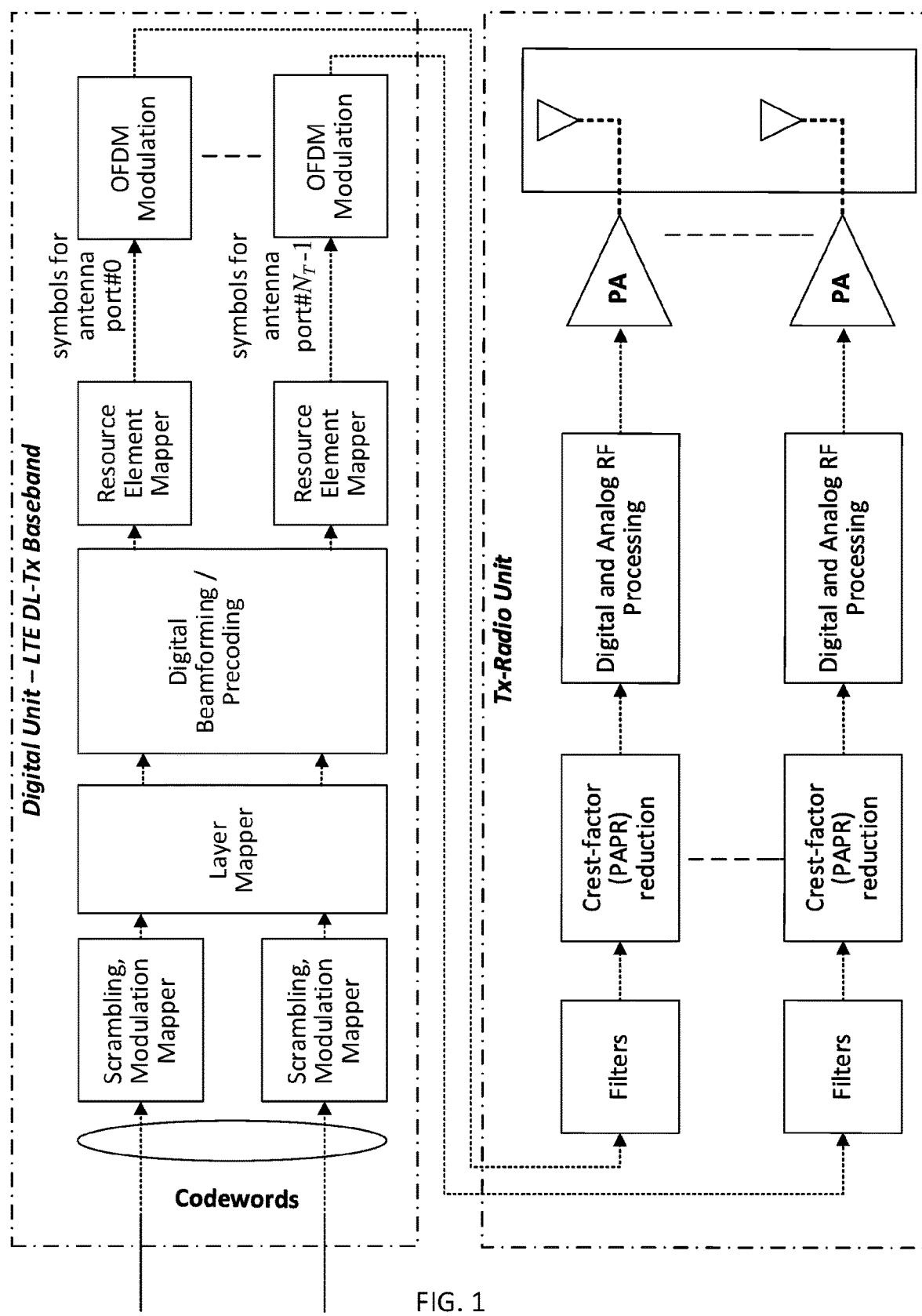
FIG. 1 illustrates a transmit baseband and radio architecture for digital beamforming.
Figure 2:
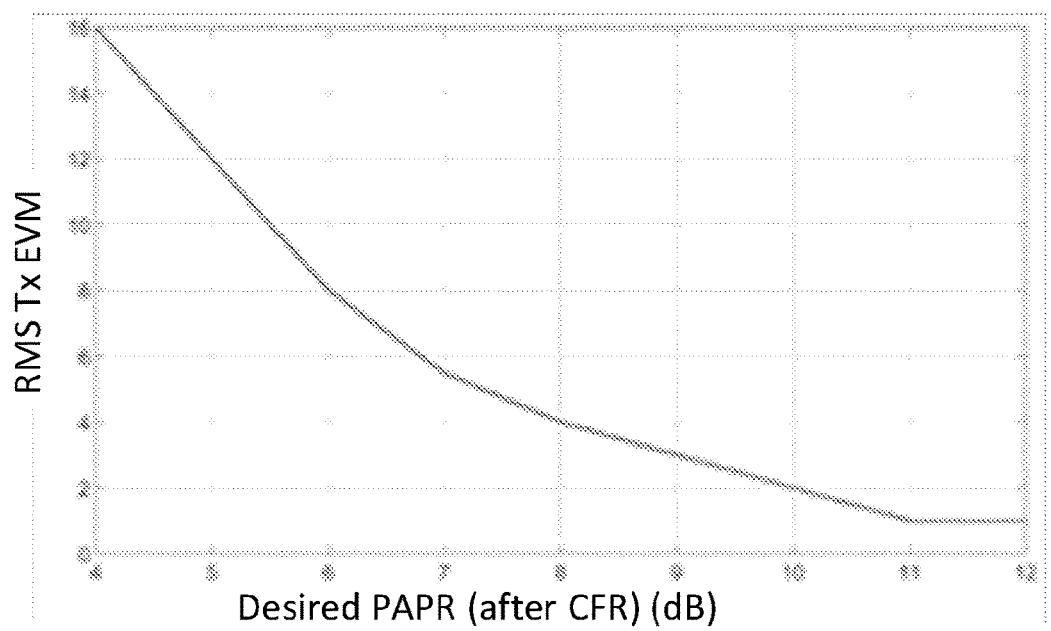
FIG. 2 illustrates the trade-off between EVM and desired PAPR in prior art.

BF BEAMFORMING
CFR CREST-FACTOR REDUCTION
DL DOWNLINK
ENB EVOLVED NODEB, BASE STATION
FFT FAST FOURIER TRANSFORM
HW HARDWARE
IAPR INSTANTANEOUS POWER TO AVERAGE POWER RATIO
MIMO MULTIPLE INPUT MULTIPLE OUTPUT
OFDM ORTHOGONAL FREQUENCY DIVISION MULTIPLEXING
PAPR PEAK TO AVERAGE POWER RATIO
PDSCH PHYSICAL DOWNLINK SHARED CHANNEL
RX RECEIVER/RECEIVER
SINR SIGNAL TO INTERFERENCE AND NOISE POWER RATIO
SNR SIGNAL TO NOISE POWER RATIO
TX TRANSMIT/TRANSMITTER
TX-EVM TRANSMIT ERROR VECTOR MAGNITUDE
UE USER EQUIPMENT
UL UPLINK

DETAILED DESCRIPTION

Throughout the drawings, the same reference designations are used for similar or corresponding elements.

As mentioned in the background section, known solutions to alleviate signal distortions due to PAPR reduction are not applicable to scenarios where detailed knowledge of the channel between the transmitter and receivers is missing. At the same time, since it is beneficial from a power amplifier efficiency to reduce the PAPR, the inventors have realized that it would be beneficial to alleviate the impact of the distortions at the receivers caused by the PAPR reduction at the transmitter by introducing spatial precoding of the distortions in an iterative manner at the transmitter. The purpose of the precoding, in which linear combinations of the distortions per antenna are formed, is to spread the distortions spatially so that they are less aligned, and hence goes less in the same directions as, the signals intended for one or several receivers, thereby reducing the effective level of interfering distortions. This does not require detailed knowledge of the channels and is applicable to all transmissions including broadcast transmission of the same signal to multiple receivers. It also eliminates the complexity associated with acquiring and using detailed channel knowledge. The only knowledge required is the precoders for the signal of interest, or the space spanned by the precoders. This knowledge is available in the transmitter since it is used to generate the signals to be transmitted and may also be estimated from the transmitted signals themselves.

In essence, the inventors have formulated the following basic solution, details of which will be discussed further on in this disclosure.

A communication device such as a base station (or UE) transmitter, today offers a trade-off among distortions (in the EVM sense), PAPR and spectral emissions. In this current solution, and as stated in the background section of this disclosure, the distortions are known to be a limiting factor for the achievable signal to interference and noise ratio, and may consequently limit the performance at least for higher order modulation alphabet and/or high rank spatial multiplexing system which benefit in operation in the high SINR regime.

Consequently, the inventors propose precoding techniques of the distortions that performs spatial shaping without considering detailed channel knowledge at the transmitter such that the detrimental effects of distortions are mitigated at the intended receiver(s). Recall that the distortions are determined to reduce the composite signals' amplitude peaks thereby reducing the PAPR. Moreover, the distortions of interest here also comprise the noise due to spectral shaping function.

In other words, for a device with $N_{Tx}$ transmitters, a distortion signal, also referred to as clip-noise, to reduce the amplitude peaks is first determined. The $N_T$), distortion signals are then precoded, meaning that $N_{Tx}$ precoded distortion signal are determined, where each precoded distortion signal being a linear combination of the $N_{Tx}$ (distortions before precoding, i.e., a sum of gain and phase adjusted distortions before precoding. In the precoding operation of the distortions, the gain and/or phases of distortions are adjusted, per subcarrier or per groups of subcarriers in the frequency domain, so that they are not aligned with the transmitted signals to one or several receiving UEs. With complete and perfect channel knowledge, it could be possible to make the distortions completely cancel out by projecting the clip-noise onto the null space of the channel for each subcarrier, to be able to do this, detailed knowledge of the channel is needed.

In the proposed solutions, it is hence an objective to choose the distortion precoders such that the transmitter distortions constructively combine in directions and polarizations, spatially, other than the desired signals' directions. The precoders for the signals of interest is an input to the method and are assumed to be chosen so that the signals combine constructively in intended receivers' locations. This means that the method is applicable to a wide range of existing precoding algorithms based on reciprocity or feedback that generate (signal) precoding weights in different ways.

Basically, a communication device such as a base station or user equipment, generates signals with desired peak amplitudes to be transmitted and notes the difference between the generated signals and ideal signals e.g. reference signals, here referred to as (signal) distortions. Subsequently, the communication device precodes the signal distortions (preferably frequency-selective in the frequency domain) with a set of precoders with preferably large (principal) angles to the M IMO-precoders used for signals of interests or some other precoder selection, and adds the precoded clip-noise/distortions to the ideal signals e.g. reference signals to be transmitted (in either frequency or time domain) to form a modified composite signal. Generation of distortions and precoding of distortions are expected to be done in an iterative fashion, and the ideal signal e.g. reference signal, for each iteration may either be the original input signal to the first iteration, or the composite signal generated in a previous iteration. Finally, the communication device transmits the composite signals that have low PAPR and/or low unwanted (out-of-band) emissions characteristics, and simultaneously mitigates the distortion at the served UE receiver location(s).

Described in a different wording, the current disclosure proposes a technique that performs spatial shaping of the distortions introduced to reduce the PAPR preferably in frequency-domain that does not rely on DL channel knowledge, but only the knowledge of the precoder of the signals transmitted whilst still mitigating the effects of the distortions at the receiver(s). In short, it is proposed to find "orthogonal" MIMO precoders for the distortion relative to the data MIMO precoders, (or subspace spanned by the data precoders). i.e., distortion precoders that have low inner products with the data precoders. By means of the distortion precoding, the distortions may be projected onto the space spanned by these "orthogonal" MIMO distortion precoders so that the level of distortion in the space spanned by the data precoders is reduced. It should also be noted that distortion precoding frequency granularity need not to be the same as the granularity used for the data, nor that the orthogonality is perfect.

Figure 3A:
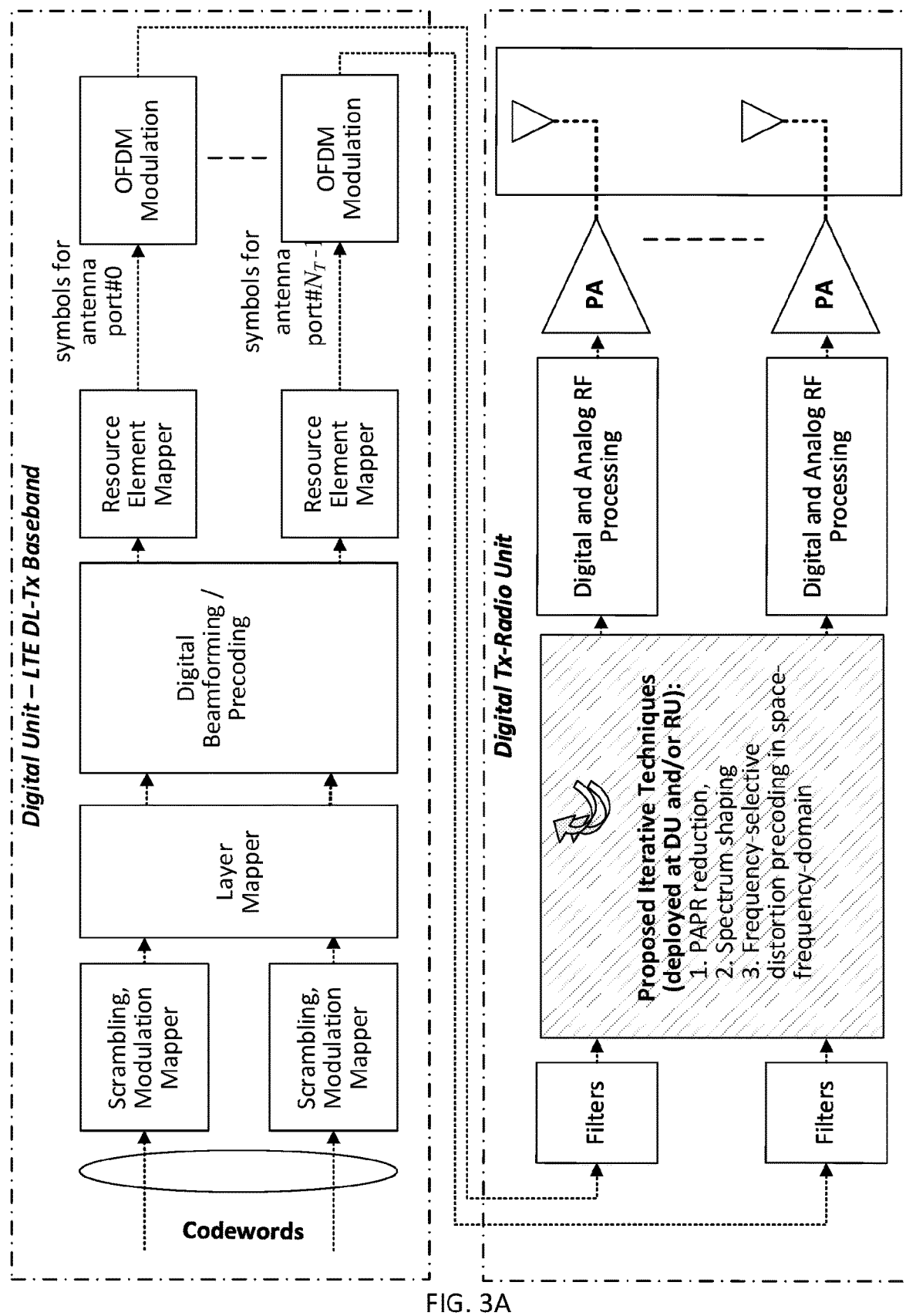
FIG. 3A illustrates an embodiment of a method according to the disclosure.
Figure 3B:
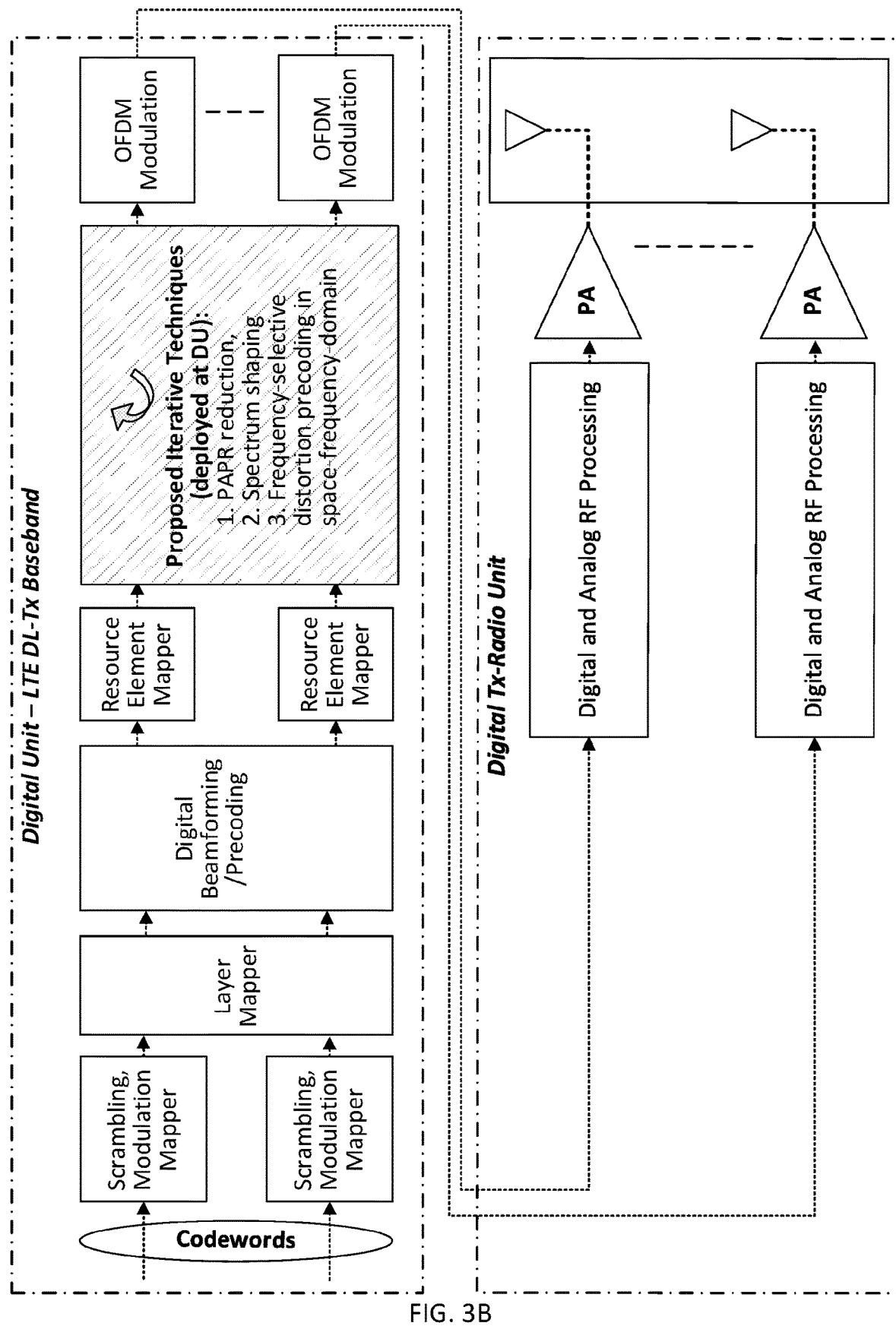
FIG. 3B illustrates an embodiment of a method according to the disclosure.

The proposed scheme in the present disclosure is either performed in the frequency domain before the OFDM modulation or after the OFDM modulator in the time domain, in both cases it is done before digital/analog RF processing, e.g., digital-to-analog converter. In FIG. 3B, an embodiment is shown with the processing done in the frequency domain prior to the OFDM modulator. Moreover, the functionalities of the proposed scheme can also be split between digital unit and radio unit, as indicated in the embodiment in FIG. 3A. In a preferred embodiment (cf. FIG. 3B), the proposed distortion precoding block (illustrated in shaded block) comprises six key components, namely, (1) CFR or PAPR reduction, (2) spectrum shaping, (3) distortion computation, (4) FFT, (5) spatial precoding of distortion, (6) IFFT.

Figure 4A:
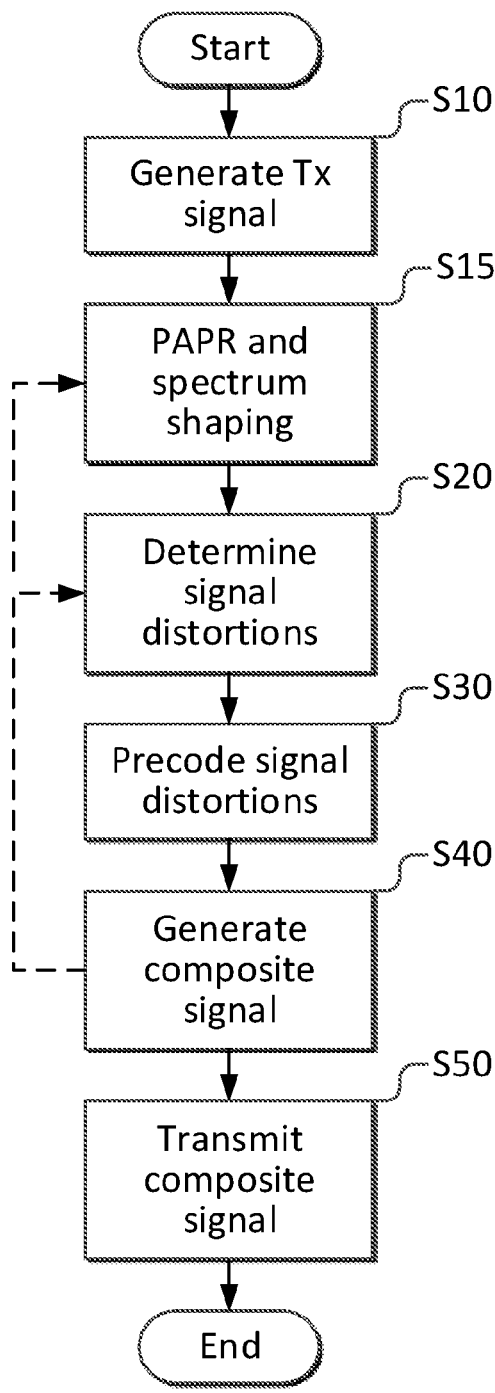
FIG. 4A illustrates an embodiment of a method according to the disclosure.

With reference to FIG. 4A, a general embodiment of a method for signal distortion mitigation in a communication device in a communication system according to the present disclosure will be described. The communication device includes at least two transmitters. The steps described can be performed in the prescribed order, or in some other order. For example, spectrum shaping can be done after the distortions are determined and as part of the precoding step; and steps S15 and S20 can be seen as a single step where distortions to reduce the signals' amplitude peaks are determined for each transmitter.

Initially, in step S10, a distortion-free signal for transmission is generated in a communication device. A signal is generated for each transmitter, thus resulting in two or more generated signals. Subsequently, within an iteration cycle, in step S15, PAPR reduction and spectrum shaping is performed based on the input signal to generate a distorted signal for transmission with reduced PAPR. In the first iteration, the input signal may be the original distortion free signal e.g. reference signal, but in the following iterations, this signal can be a distorted composite signal formed in a previous iteration or it may be formed based on the original distortion free signal, a distorted composite signal, precoded distortions and non-precoded distortions determined in previous iterations. In a following step S20, signal distortions for each of the provided distorted signals are determined per transmitter, based on the distorted signal generated in S15 as well as the inputs to step S15 which hence may comprise also precoded and non-precoded distortions, the original ideal signal e.g. reference signal, and an interim distorted signals of previous iterations. As mentioned above, steps S15 and S20 can be done jointly with the purpose to determine distortions that reduces the PAPR.

Then, in step S30, the determined signal distortions are precoded in frequency-domain, using a set of precoders, which are selected as a function of the precoder weights corresponding to the signals of interest.

Further, in step S40, a composite signal for transmission is generated at least based on the precoded determined signal distortions, the generated signal for transmission or a composite signal generated in a previous iteration. In certain embodiments, step S40 is omitted in all iterations but the last one when the signal is to be transmitted. The non-precoded and precoded distortions determined in step S20 and S30 are then provided as inputs to steps S15 and S20 in the next iteration to refine the distortions.

The aforementioned steps S15-S40 can be performed repeatedly, as indicated by the dashed arrow in FIG. 4A until a predetermined condition for the composite signal is fulfilled. Such a condition could comprise reaching a predetermined PAPR requirement or after a predetermined number of iterations have been performed. Also other conditions are perceivable. Further, according to another embodiment, the step S30 of precoding the determined distortion can be omitted in a final iteration or some of the iterations of the sequence of steps.

Finally, the composite signal is transmitted, in step S50, thus enabling mitigation of the distortion impact in at least one receiving communication device whilst rendering reduced PAPR and low unwanted emissions per transmitter.

The order in which the above steps are performed and included in a series of iterations can be varied in dependence on the type of iterative scheme that is utilized. Consequently, and with reference to FIG. 4B, an ideal signal for transmission (for each transmitter in the communication device) is generated in a first step S10. Subsequently, PAPR reduction and spectral shaping is performed, in step S15, for each such generated ideal transmission signal to provide, in some sense, distorted signals for transmission. A decision to perform a distortion precoding or not is subsequently taken. If the decision is positive, the method continues to the step S20 of determining signal distortions for the provided distorted signals. This can be performed based on at least the generated ideal transmission signal and the provided distorted signals. Subsequently, the determined signal distortions are precoded, preferably frequency selective precoding, in step S30. Finally, a composite signal is generated per antenna branch, in step S40 based on the precoded distortions and the ideal transmission signal. It is then determined if further iterations are needed or if the generated composite signal is ready for transmission in step S50. If it is determined that further iterations are needed, the method restarts in step S15 and proceeds through at least some of the subsequent steps. Note that if no precoding of the distortions is performed, then generation of composite signal in step S40 is trivial, the composite signal after step S40 equals the signal generated after step S15.

Figure 4B:
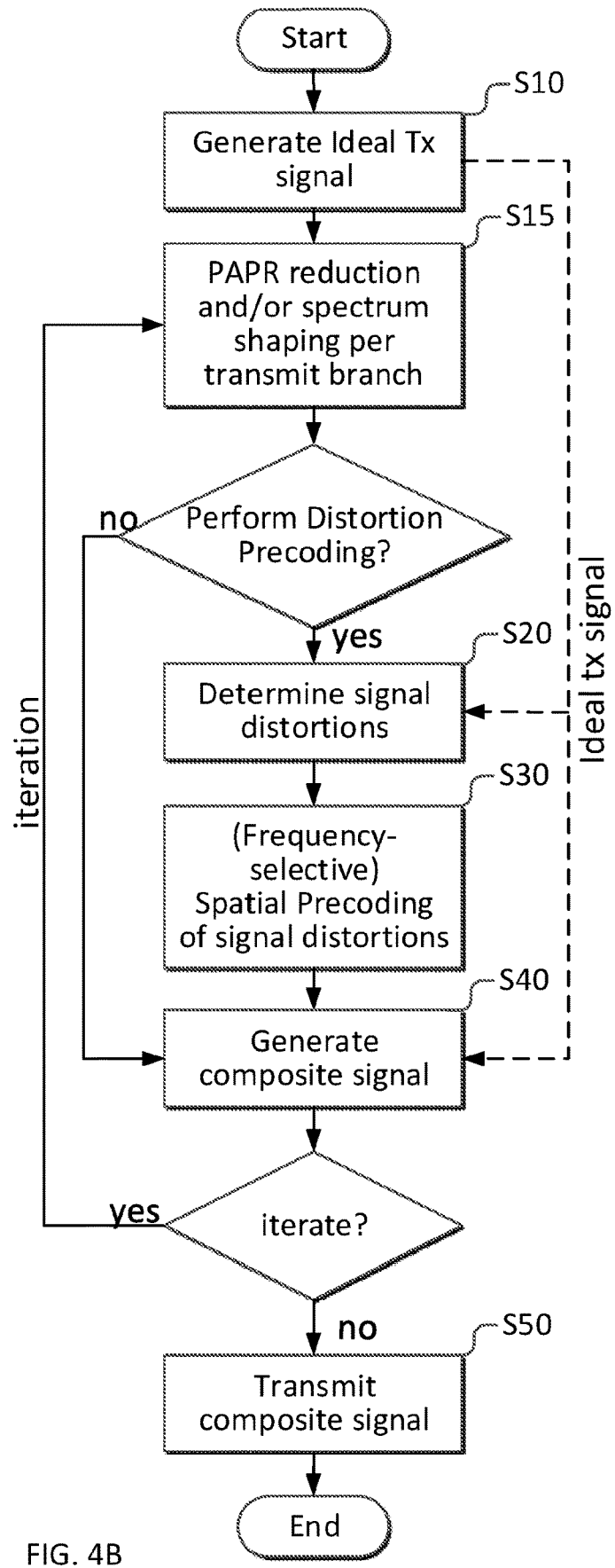
FIG. 4B illustrates another embodiment of a method according to the disclosure.
Figure 4C:
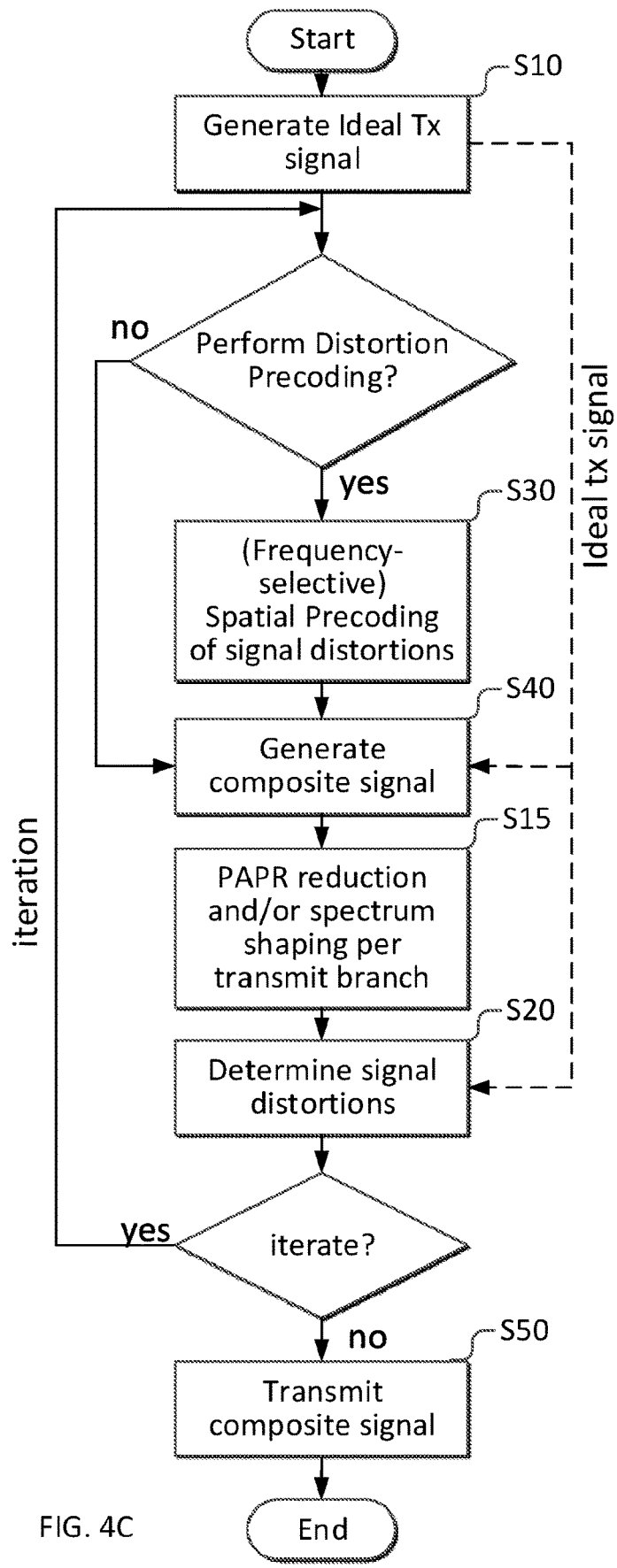
FIG. 4C illustrates yet another embodiment of a method according to the disclosure.

According to another embodiment, with reference to FIG. 4C, an ideal signal e.g. reference signal for transmission for each transmitter in the communication device is generated in a first step S10. In the first iteration, the composite signal is equal to the ideal signal e.g. reference signal, i.e., no distortion exists. Then it is decided, in a first decision, if distortion precoding is to be performed. If the result of this first decision is negative, the method continues to a generation of composite signal step S40, and then the generated composite signal is the composite signal corresponding to the previous update. So, in the first iteration with no distortion precoding, composite signal is equal to the ideal signal e.g. reference signal.

Subsequently, in step S15, PAPR reduction and spectral shaping of the generated composite signal is performed. It is then determined if further iterations are needed or if the thus generated composite signal is ready for transmission in step S50. If it is determined that further iterations are needed, the procedure moves to a first decision step whether distortion precoding is required at the considered iteration. If the decision is positive, signal distortions due to PAPR reduction and spectrally shaping is obtained in step S20 followed by step S30 to perform distortion precoding according to the previously described embodiments. Finally, PAPR reduced and spectrum shaped composite signal with precoded distortion is transmitted when the number of iterations are elapsed, otherwise the method continues to the first decision whether distortion precoding is required.

Figure 4D:
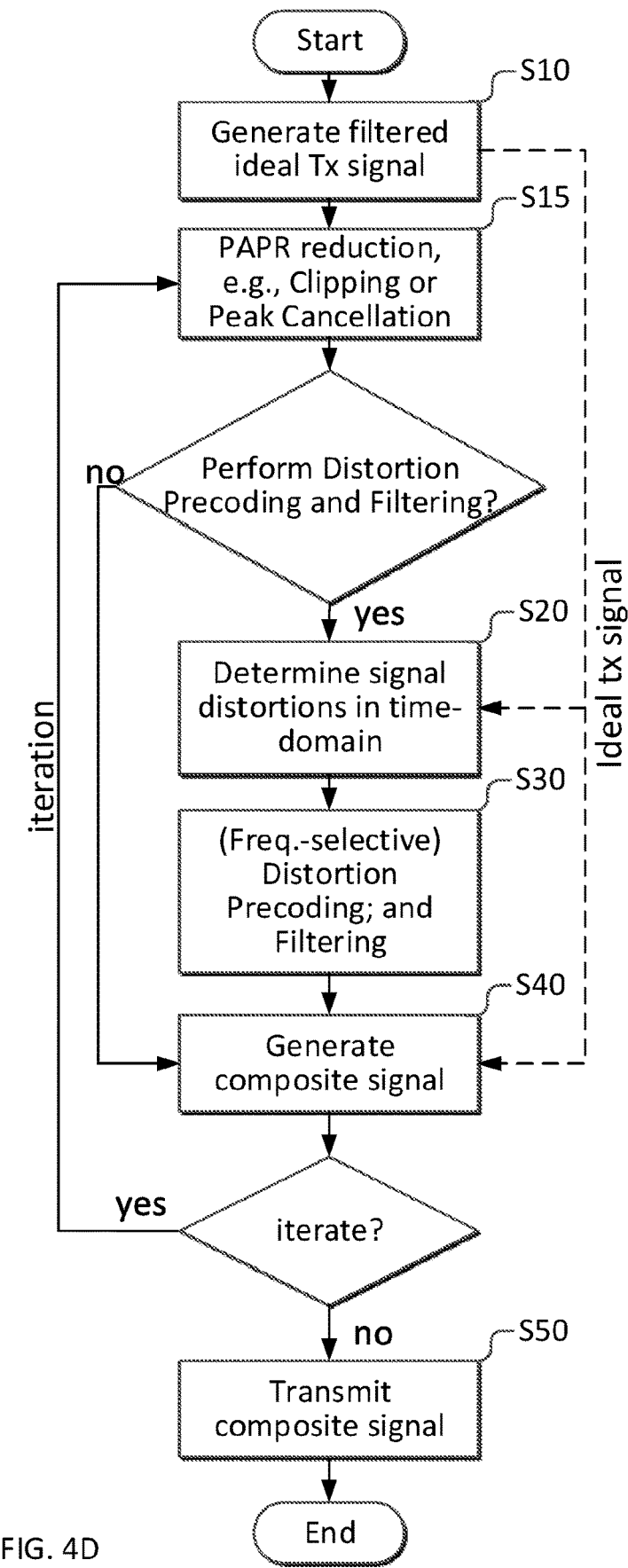
FIG. 4D illustrates an embodiment of a method according to the disclosure.

According to yet another embodiment corresponding to FIG. 4D, an ideal signal e.g. reference signal followed by channel filtering or spectrum shaping (including any interpolation if necessary) for transmission for each transmitter in the communication device is generated in a first step S10. Subsequently, PAPR reduction (e.g., peak-cancellation [7] or iterative clipping and filtering also known as turbo clipping) is performed, in step S15, for each such generated filtered ideal transmission signal. A first decision device checks whether a distortion precoding with spectrum shaping is required or not in the considered iteration. If the decision is positive, the method continues to the step S20 of determining signal distortions for the provided distorted signals. This can be performed in time-domain based on at least the generated ideal transmission signal and the provided distorted signals, or the clip-threshold knowledge and the provided distorted signals. Subsequently, the determined signal distortions are precoded in frequency-domain, preferably frequency selective precoding, in step S30 including. Moreover, the precoded distortions are filtered or spectrum shaped in step S30 itself. Finally, a composite signal is generated, in step S40 based on the precoded and filtered distortions, and the ideal transmission signal. It is then determined if further iterations are needed or if the thus generated composite signal is ready for transmission in step S50. If it is determined that further iterations are needed, the method continues to step S15 and proceeds through at least some of the subsequent steps. Note that if no precoding of the distortions is performed, then generation of composite signal in step S40 is trivial, the composite signal after step S40 equals the signal generated after step S15.

The iterations can be performed one or more times and with some variation in the steps included in each iteration.

Figure 5:
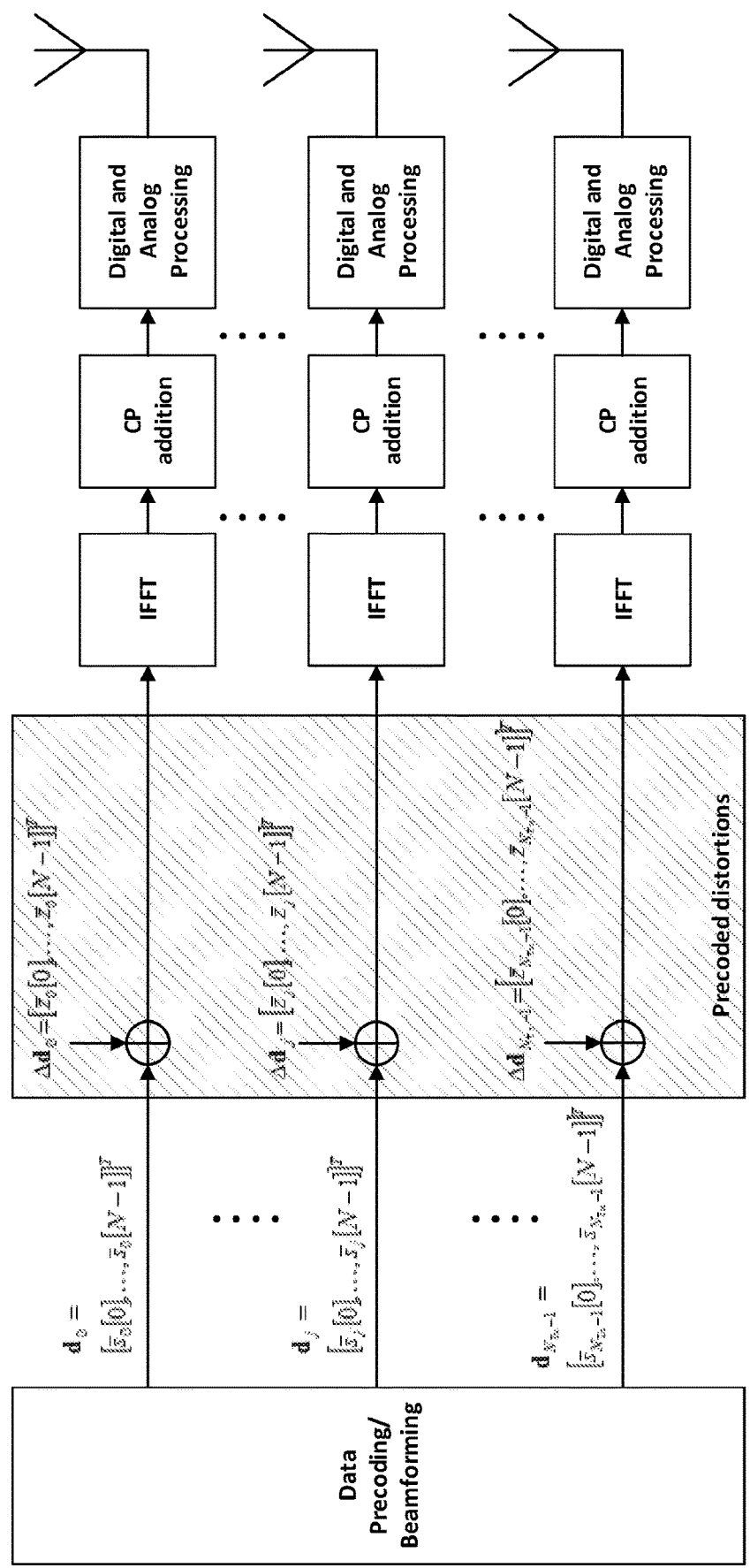
FIG. 5 illustrates an embodiment according to the present disclosure.
Figure 6A:
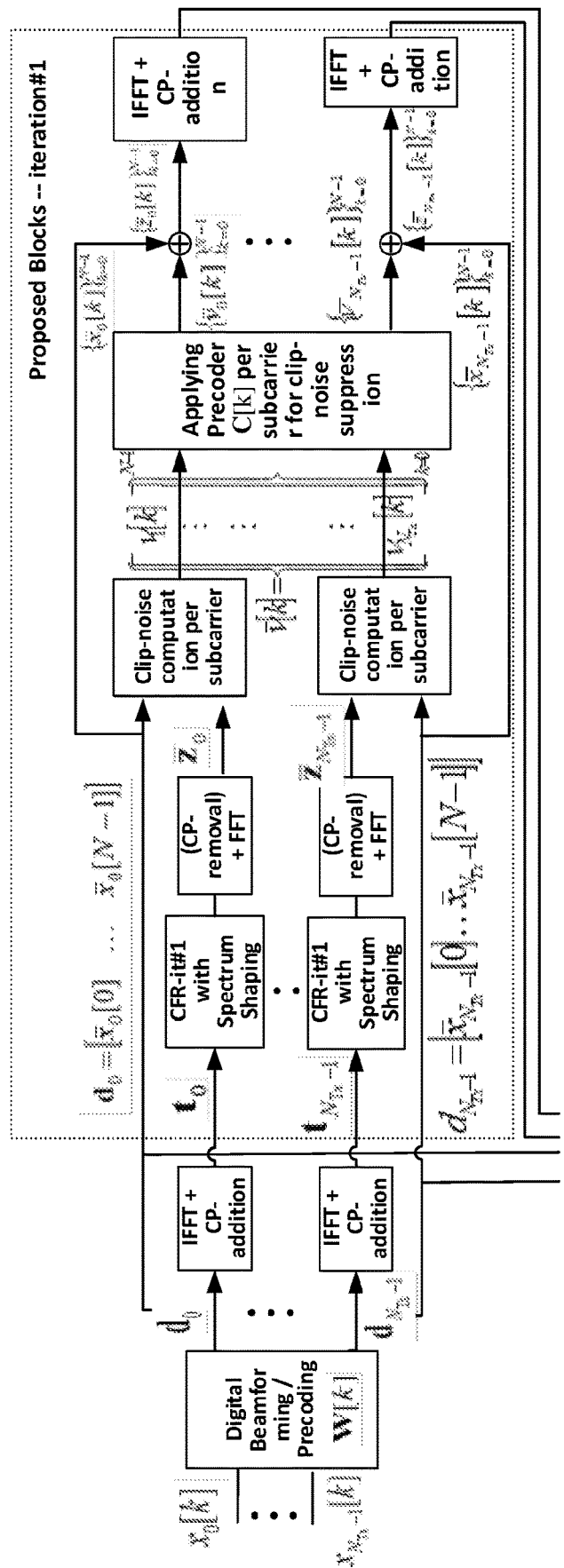
FIG. 6A-6C illustrate an embodiment of the proposed precoding technique of distortion.
Figure 6B:
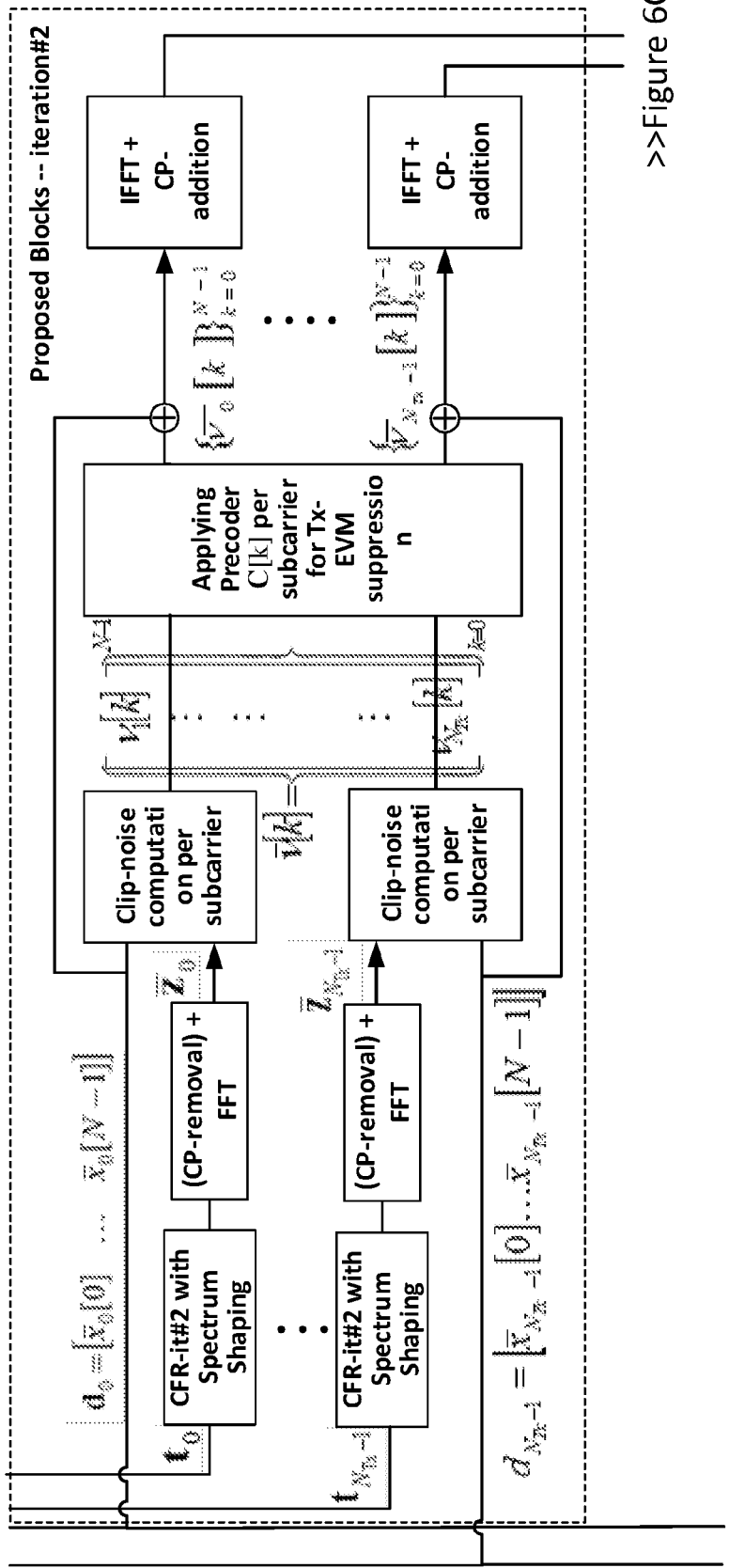
Figure 6C:
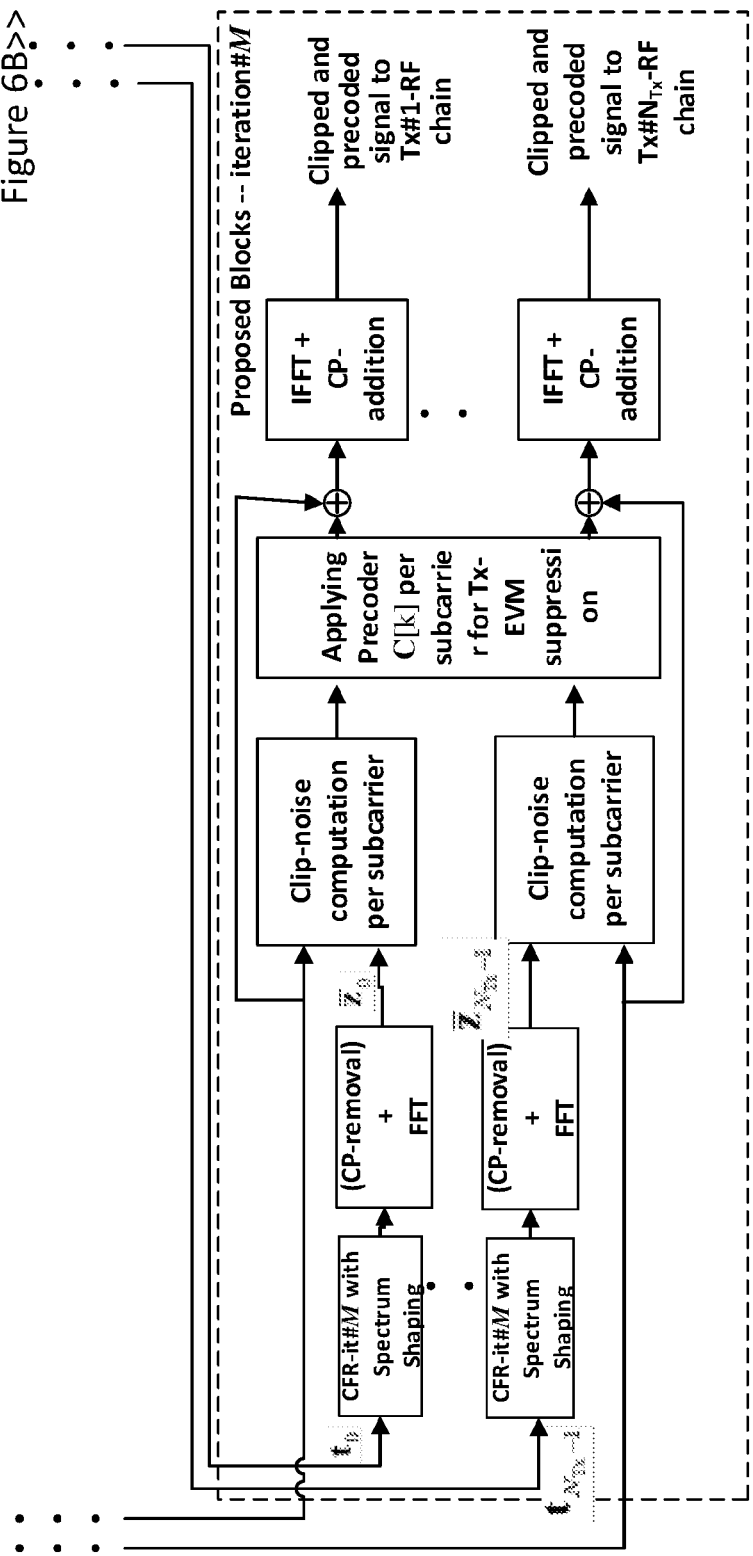

With reference to FIGS. 4A-4D as well as FIG. 5, a number of more in-depth embodiments of the disclosure will be described.

The step S20 of determining signal distortions comprise determining a difference between said provided distorted signal and a reference signal. The reference signal may be the input signals to the current iteration from a previous iteration, the original ideal input signals', or a signals constructed from the mentioned signals and the precoded or non-precoded signals determined in previous iterations.

The distortions are determined in the frequency domain for a plurality of subcarriers, for each OFDM symbol: this can be done in several ways (but not limited to), e.g., (1) Computing distortions in frequency-domain by transforming the differences between time-domain composite signal and time-domain reference signal to the frequency domain using an FFT, (2) Obtaining distortion in frequency domain by determining the difference between the generated/composite signals and the reference signal that are transformed to the frequency domain using FFT.

The further description mainly exemplifies approach (2) for the distortion computation in detail (unless stated otherwise).

The precoding step S30 can be performed in a number of different ways. The purpose of the precoding is to mitigate the impact of the distortions introduced by the PAPR reduction at intended receiver(s). More specifically, the distortion precoders matrices are selected to on average reduce or even completely remove the distortions contributions in the subspace spanned by the signals of interest precoders, one example being selecting the distortion precoder as a projection onto the orthogonal complement to the subspace spanned by the data signals' precoders corresponding to the desired signals. The distortion precoding is preferably frequency selective in the sense that a different distortion precoder is selected for each of a plurality of subcarriers. The frequency selective precoding can also be based on pseudo-random or cyclic or other orderly selection of distortion precoder as a function of the subcarrier index/number in addition to the MIMO precoder matrices used for the transmission of the signals to the at least one receiver.

According to a further embodiment, the precoding step S30 is performed based on those precoder matrices used for the transmission of the signals to the at least one receiver.

The precoders for the precoding step S30 can be selected or determined based on a random selection from a set of MIMO-precoders, which set of MIMO precoders can be determined as a function of the precoder matrices used for the transmission of the signals to the at least one receiver.

According to a further embodiment, the precoding step S30 can be based on the random selection from the set of MIMO-precoders as a function of the subcarrier index/number.

Another way to select the MIMO precoders can be to select MIMO-precoders that have low inner products with the MIMO precoders used for the signals to be transmitted and such that subcarrier index is used to select a precoder from a set of precoders with sufficiently low inner products.

According to further embodiments, the selected MIMO-precoders are different for different subcarriers or groups of subcarriers.

Additionally, the precoding step S30 can be based on a feedback request from a user equipment, which feedback comprises one or several precoder/beam indices such that a beam energy at the user equipment is minimized, below a certain threshold related to the index minimizing the beam energy.

With reference to FIG. 5 and FIGS. 6A-6C, an example embodiment of the present disclosure will be described in more detail. In order to be able to describe more in detail the precoding and outline some embodiments, the following notation is now introduced: A vector is denoted by bold and lower case letter a, and a matrix is denoted as bold and upper case letter A. The i-th element of the vector a is denoted by $a_i$. The transpose and conjugate transpose of a vector a is denoted by $a^T$ and $a^H$, respectively; and similarly transpose and the Hermitian/conjugate transpose of a matrix is A denoted as $A^T$ and $A^H$, respectively. The K×K identity matrix is written as $I_K$. The Hermitian transpose Fourier matrix $F_N^H \in X^{N \times N}$ is an N-point IFFT matrix with (n,k) element of $F_N^H$ defined as $(1/\sqrt{N})\exp(j2\pi nk/N)$ and the N-point FFT matrix is denoted as $F_N \in X^{N \times N}$. The set of complex numbers is denoted by X. The K×1 size of a complex-valued column vector a is denoted as $a \in X^{K \times 1}$, and K×L size of a complex-valued matrix A is denoted as $A \in X^{K \times L}$. The operator trace{B} is the sum of the main diagonal elements of the square matrix B.

The signals to be transmitted from $N_{Tx}$ antennas on subcarrier k for an OFDM symbol l (where the OFDM symbol index l is dropped for brevity, unless otherwise stated explicitly), is formed as $$x[k]=W[k]s[k]+\bar{z}[k] \qquad (1)$$

Here $x[k]=[x_0[k], \ldots, x_{N_{Tx}-1}[k]]^T$ models the $N_{ss}$ spatial layers carrying for example data or reference signals intended for one or multiple receivers, $w[k] \in X^{N_{Tx} \times N_{ss}}$ is the MIMO precoder that maps the $N_{ss}$ layers to the $N_{Tx}$ antennas. Furthermore, the $N_{Tx} \times 1$ vector $\bar{z}[k]=[\bar{z}_0[k], \ldots, \bar{z}_{N_{Tx}-1}[k]]^T$ are the distortions introduced to reduce the PAPR in the generated time domain signal. Note that for time domain signal generation with an FFT of size N, not all the subcarriers are typically used, and the set of N subcarriers can be divided into two sets, an active and an inactive set denoted as T and $T^Y$, respectively. The set T defines the set of subcarriers utilized for signal transmission with FFT size N, while the complementary set $T^Y$ defines the set of subcarriers not utilized for any transmission. The total number of active subcarriers |T| is $N_{sc}$ within the FFT size N (where $N_{sc} \leq N$).

The received signals in a receiving device (assuming perfect time and frequency synchronization, and channel delay dispersion not exceeding the cyclic prefix) for the transmit model with distortion in Equation (1) can be written as, $$y[k]=H[k]x[k]+n[k]=H[k]W[k]s[k]+H[k]\bar{z}[k]+n[k] \qquad (2)$$

where y[k] is $N_{Rx} \times 1$ vector representing the received signals after OFDM demodulation for subcarrier k. Furthermore, H[k] models the propagation channel between transmitter and receiver, and n[k] models noise and intercell interference. It can be noted that the same model applies to both cases with a single receiving terminal as well as multiple receiving terminals.

It is further assumed that a linear receiver with combining weights $G^H[k]$ is used so that the terminal combines the signals received and determines an estimate of the complex symbol corresponding to the i-th spatial stream for the k-th subcarrier as $$\hat{s}_i[k] = g_i^H[k] y[k] \quad (3)$$

where $g_i^H[k]$ corresponds to the i-th row vector of $G^H[k]$.

Combining Equation (2) with Equation (3) gives (dropping subcarrier k notation for brevity)

$$\hat{s}_i = g_i^H H w_i s_i + \sum_{j \neq i} g_i^H H w_j s_j + g_i^H H \bar{z} + g_i^H n,$$

$$\hat{s}_i = g_i^H H w_i s_i + \sum_{j \neq i} g_i^H H w_j s_j + g_i^H H \bar{z} + g_i^H n,$$

where $w_i$ corresponds to the i-th column of data transmit beamforming/weight matrix $W[k]$. Here, the first term represents the signal of interest, the second term is inter-stream interference, and the third term is the contribution from the distortions.

If it is further assumed that the transmit weights for the stream are determined so that the signal power is large in the sense that $g_i^H H w_i$ is large. One interpretation of this is that the angle between $w_i$ and $H^H g_i$ is small, so that, $H^H g_i$ is roughly a scaled version of $w_i$. At the same time, for the effective distortions to be low, it is desirable that $g_i^H H \bar{z}$ is small. It then follows that to mitigate the impact of the distortions, assuming that $H^H g_i$ is proportional to $w_i$, is to select the distortions so that (the magnitude of) $w_i^H \bar{z}$ is small, i.e. close to zero. Furthermore, since there are $N_{sc}$ spatial streams (carrying data or reference signals to one or multiple users) associated with $N_{sc}$ columns in the desired signal precoding matrix $W[k]$, it further follows that the distortions are then selected so that the elements (or a norm) of $W^H[k]\bar{z}[k]$ is small or low enough.

To meet the requirement $W^H[k]\bar{z}[k] \approx 0$, a distortion precoder, is introduced to spatially transform or project the distortions obtained from applying per transmit branch CFR. More specifically, for a given iteration, the distortions determined after CFR per antenna for subcarrier k in a given iteration, $z[k]$, are precoded using a subcarrier specific precoder matrix $[k]$, so that $\bar{z}[k] = C[k]z[k]$ and the generated signal, which may be the input to the per transmit branch CFR in the next iteration corresponds to $$\bar{x}[k] = W[k]s[k] + C[k]z[k] = \bar{s}[k] + \bar{z}[k] \quad (4)$$

rather than $x[k] = W[k]s[k] + z[k]$ which would be the case without any distortion precoding.

In order to mitigate the impact of the distortions at the receiver side, the precoders are preferably chosen so that the magnitudes of the elements of $C[k]W[k]$ are small, either for each subcarrier or on average, for the set of subcarriers used for transmission. A key aspect of selecting the distortion precoders $\{C[k]\}$ is to compute or obtain them based on the knowledge of the desired signals' precoding matrices $\{W[k]\}$ rather than on the knowledge about the channel between the transmitter and the receiver(s). It should be noted that this is applicable both for transmission of several signals to different users as well as for transmission of the same signal to multiple users (examples of which include reference signals and control channels that are to be received by all terminals served in a cell).

Depending on the embodiment, there are several different ways to select the set of distortion precoders.

In one embodiment, the distortion precoding matrix for a subcarrier k is determined as $C[k] = I_{N_{Tx}} - W[k](W^H[k] W[k])^{-1} W^H[k]$, which may be viewed as a projection matrix onto the space orthogonal to space spanned by the columns of the desired signals' precoding $W[k]$.

In another embodiment, the distortion precoder weights for subcarrier are chosen as $C[k] \alpha P_{W[k]}^\perp + (1-\alpha) P_{W[k]}$ where $\alpha$ is a design parameter, typically between zero and one tuned in the design to tradeoff distortion mitigation and PAPR reduction, $P_{W[k]} = W[k](W^H[k] W[k])^{-1} W^H[k]$ is a projection matrix onto the space spanned by the columns of $W[k]$ and, $P_{W[k]}^\perp = I_{N_{Tx}} - W[k](W^H[k] W[k])^{-1} W^H[k] = I_{N_{Tx}} - P_{W[k]}$ is the projection onto the corresponding orthogonal complement.

In another embodiment, the distortion precoding matrices are selected from a distortion codebook denoted as $X^\perp$. Such a codebook can be constructed from the codebooks X defined for channel state information feedback in the 3GPP LTE standard 36.213 v 14.2.0. Such code books are defined for up to 8 layers and 32 antenna ports and the design can be extended also to larger number of antennas. For each precoding matrix $\tilde{W}_p \in X$, where p herein is a precoder index in a standard codebook X for a considered rank/layers, a distortion precoder with a corresponding precoder index p in a distortion codebook $X^\perp$ for the considered rank is constructed $\{C_p = \tilde{W}_p (\tilde{W}_p^H \tilde{W}_p)^{-1} \tilde{W}_p^H = \tilde{W}_p \tilde{W}_p^H\}$ as a projection matrix onto the subspace spanned by the columns of the candidate $\tilde{W}_p$ (where LTE codebooks are semi-unitary, i.e., $\tilde{W}_p^H \tilde{W}_p = I_{N_S}$).

codebooks constructed from an orthonormal matrix. A non-limiting example is to take an $N_{Tx} \times N_{Tx}$ DFT matrix, $\Phi$, and for a given design parameter K construct a codebook $X^\perp$ with $$\binom{N_{Tx}}{K}$$

entries, where each entry is an $N_{Tx} \times (N_{Tx} - K)$ matrix formed by removing K columns from $\Phi$.

To select a suitable distortion precoder $C[k] \in X^\perp$ to be used on subcarrier k from the constructed distortion precoder codebook $X^\perp$, firstly, a set of candidate precoders $\Omega_W^\perp$ is determined that has large enough (subspace) distances to the signals' subspace $W[k]$, which is defined as the space spanned by the signal precoder $w[k]$, i.e.

$$\Pi_W^\perp = \{p : c/(W[k], \tilde{W}_p) \geq \delta\}; W[k], \{\tilde{W}_p\} \in X, \quad (5)$$

Here, both $W[k] \in X$ and all the candidate precoders $\{\tilde{W}_p\} \in X$ belong to the same codebook X. So, $\Pi_W^\perp$ is a set of suitable distortion precoder indices that has large (subspace) distance $d(W[k], \tilde{W}_p)$, relative to a given/user-defined threshold $\delta$, between the signal precoder $W[k]$ and the p-th candidate precoder $\tilde{W}_p$ in the codebook X. After finding the suitable distortion precoder indices set $\Pi_W^\perp$, In one embodiment, if there is only one candidate in the set $\Pi_W^\perp$, i.e., $|\Pi_W^\perp| = 1$, then select the suitable distortion precoder index from the set $p^\perp \in \Pi_W^\perp$. Based on the selected precoder index $p^\perp$ the suitable distortion precoder is selected from the pre-computed distortion codebook in the previously mentioned embodiment, i.e., $C[k] = C_{p^\perp} \in X^\perp$.

In a specific embodiment, if more than one distortion precoder indices exist in the set $\Pi_W^\perp$ (where $|\Pi_W^\perp|>1$) that has high (subspace) distance to the signal precoder $W[k] \in X$, then a suitable precoder index $\bar{p}^\perp$ can be pseudo-randomly selected from the set $\Pi_W^\perp$, and thereby a suitable distortion precoder is obtained from the distortion codebook as described in the previously mentioned embodiment, i.e., $C[k]=C_{\bar{p}^\perp} \in X^\perp$.

In another specific embodiment, the distortion precoder index that maximizes the distance can also be selected so that set of candidate distortion precoders only contain a single candidate.

In (5), different distance metrics, $d(W[k], \tilde{W}_p)$, can be utilized; if both $W[k]$ and $\tilde{W}_p$ span subspaces, one can employ various measures which are essentially functions of the principal angles between the subspaces, see also [6] and [10], examples including a Fubini-Study distance, in the sense that $d(W[k], \tilde{W}_p) = \cos^{-1}(|\det(\tilde{W}_p^H W[k])|)$. An alternative distance metric could be to take the sum of the square of the sinus of the principle angle, which essentially corresponds to $d(W[k], \tilde{W}_p) = \text{trac}\{I_{N_{Tx}} - W[k](W^H[k]W[k])^{-1}W^H[k]\tilde{W}_p (\tilde{W}_p^H \tilde{W}_p)^{-1}\tilde{W}_p^H\}$. It should be noted that these computations can be simplified, for example, ensuring that the entries of the codebook matrices are unitary matrices.

For the case that the same signal precoding matrix is used for multiple subcarriers or groups of subcarriers, different precoders may be pseudo-randomly selected from the distortion codebook $X^\perp$ for each subcarrier or group of subcarriers.

It should also be noted that to determine the set of distortion precoders

The same precoder can be determined for a set of sub carriers and also be used for several consecutive OFDM symbols. For example, in an embodiment for LTE, the same distortion precoder can be determined for all resource elements within one or several physical resource block, i.e., groups of adjacent OFDM symbols and subcarriers.

In the determination of distortion precoders, certain signals can be neglected in the sense that columns of the precoding matrix $W[k]$ are omitted in the determination. Such signals could for example include reference signals or (low rate) control channel which are robust to interference and/or only occupy a small fraction of resource elements.

In the determination of the precoder for a certain subcarrier, knowledge of precoders used also for the transmission of signals in other, for example, adjacent precoders may be used. In one embodiment, one may form covariance matrices, $R_{WW}[k]=W[k]W^H[k]$, for a set of subcarriers and determine a distortion precoder from a linear combination of covariance matrices for a set of subcarriers. If such a linear combination of covariance matrices is denoted as $\bar{R}_{WW}[k]$, an example would be to select the distortion precoder $C[k]$ so that it minimizes some function of $\bar{R}_{WW}[k]$ and $C[k]$, for example trace $\{\bar{R}_{WW}[k]C[k]\}$, subject to constraints, for example $C[k]=\eta I_{N_{Tx}}+\tilde{W}\tilde{W}$ where $\eta$ is a design parameter and $\tilde{W}$ is constrained for example to either belong to a codebook $X$ or to have certain norm, rank and orthogonality between the columns. Note that in certain embodiments, the set of precoding weights used to determine the distortion precoder for a certain subcarrier does not include the precoding weights used for transmission of desired signal at the corresponding subcarrier.

There are also embodiments, where the distortion precoders are chosen independently of the precoder weights used for transmission of desired signals. In such embodiments, the precoding of the distortion is frequency-selective in the sense that the subcarriers are partitioned into disjoint sets, and the sets use different distortion precoding weights. Furthermore, the distortion precoder weights may then be chosen to reduce the average distortion in a set of directions, each direction corresponding to precoding weights being used for precoding of a signal in all the subcarriers allocated for transmission of the said signal.

A non-limiting example is to form an oversampled $N_{Tx} \times LN_{Tx}$ DFT matrix, $\Phi$, where the element in column c on row r is given by $$\Phi_{r,c} = \frac{1}{N_{Tx}} \exp\left(-j2\pi \frac{rc}{LN_{Tx}}\right),$$

Then for the k-th subcarrier, the precoding matrix is constructed as $$W[k]=\tilde{\Phi}\tilde{\Phi}^H$$

where $\tilde{\Phi}$ is an $N_{Tx} \times N_R$ matrix constructed by taking the $N_R$ columns $\mod(k, LN_{Tx})$, $\mod(k+L, LN_{Tx})$, ..., $\mod(k+(N_R-1)L, LN_{Tx})$ of the matrix $\Phi$. Here, columns are numbered between 0, ..., $LN_{Tx}-1$ and $\mod(a, b)$ denotes the modulo operation, a mod b, i.e, the remainder of a divided by b. Both L and $N_R$ are design variables that are tunable. In order to offer more degrees of freedom for PAPR reduction, the distortion precoder for subcarrier k is selected as $\kappa_1 \tilde{\Phi}\tilde{\Phi}^H + \kappa_2 (I_{N_{Tx}} - \tilde{\Phi}\tilde{\Phi}^H)$ and the parameters $\kappa_1$ and $\kappa_2$ are additional design parameters satisfying $\kappa_1+\kappa_2=1$ and tuned in the design process to achieve a suitable tradeoff between PAPR reduction and receiver distortion mitigation.

After describing the embodiments concerning the construction of the suitable distortion precoders, we next detail an embodiment of the inline with FIG. 4B. An overview is given in Table 1. This algorithm is run for each OFDM symbol.

TABLE 1

Algorithm-1 to reduce PAPR and unwanted emissions, and mitigate received distortions
Algorithm-1:

| | | |
|---|---|---|
| 0: | Inputs : $\bar{S}$, $\{C[k]\}, \{\gamma_{threshold}^{(0)},...,\gamma_{threshold}^{(Niter-1)}\}$, $\bar{X}^{(-1)} = \bar{S}$ | $k \in \{0,...N-1\}$ |
| 1: | for $\iota = 0,1,2,...N_{iter}-1$ do | |
| 2: | $\bar{Y}^{(\iota)} = g^{CFR}(\bar{X}^{(\iota-1)}; \gamma_{threshold}^{(\iota)})$ | % CFR function |
| 3: | $\bar{Z}^{(\iota)} = \beta^{(\iota)}(\bar{Y}^{(\iota)} - \bar{S})$ | % distortion update |
| 4: | $\bar{X}^{(\iota)} = f^{PRECODING}(\bar{Z}^{(\iota)}; \bar{S}, \{C[k]\})$ | % distortion precoding and signal update |
| 5: | end for | |

Inputs to the algorithm-1 (Step-0) are:
1. Ideal precoded signal matrix $\bar{S} \in X^{N_{Tx} \times N}$, in the frequency domain. The kth column corresponds to the non-distorted signal $W[k]s[k]$ transmitted on subcarrier k and L is an oversampling factor multiplied with the FFT size N used. On non-active subcarriers, all elements of the column are set to zero. Equivalently, the ideal signals may also be provided in the time domain, since the corresponding frequency domain signals may be constructed by means of OFDM demodulation or an FFT.
2. Distortion precoder set $\{C[k]\}$
3. The desired maximum number of iterations $N_{iter}$ and a set of clip-thresholds' $\{\gamma_{threshold}^{(0)}, \ldots, \gamma_{threshold}^{(N_{iter}-1)}\}$,
   Iterations can continue until e.g. a desired PAPR has been achieved.
   Clip-thresholds can be increase with iteration number to accelerate the convergence towards the desired PAPR threshold of the generated composite signal.
4. Initialization of the composite signal matrix as $\overline{X}^{(-1)} = \overline{S}$.

Step-2 in Iteration ι:

Step-2 in algorithm-1 corresponds to the step S15 in FIG. 4B. In this step, CFR functionality essentially performs PAPR reduction and spectrum shaping per transmit antenna branch. The function $\overline{Y}^{(\iota)} = g^{CFR}(\overline{X}^{(\iota)}; \gamma_{threshold}^{(\iota)})$ comprises generating a time domain signal from the input composite signal matrix $\overline{X}^{(\iota-1)}$ for each transmit branch, performing crest factor reduction for each branch separately in the time domain using a clip-threshold $\gamma_{threshold}^{(\iota)}$ and transforming the distorted time domain signal back to the frequency domain:

---
function $\overline{Y}^{(\iota)} = g^{CFR}(\overline{X}^{(\iota)}; \gamma_{threshold}^{(\iota)})$:        (6)
1:     $T = F_{N \times N}^{H}(\overline{X}^{(\iota)})^T$     %IFFT operation
2:     $U = f^{CFR}(T; \gamma_{threshold}^{(\iota)})$     %per tx-branch CFR operation
3:     $\overline{Y}^{(\iota)} = (F_{N \times N} U)^T$     %FFT operation
---

The first sub-functionality performs OFDM modulation (i.e., IFFT operation ignoring CP addition) of the frequency-domain composite signal matrix $\overline{X}^{(\iota-1)}$ (i.e., IFFT operation per transmit branch). In this sub-functionality, an auxiliary time-domain composite signal matrix is created $T \in X^{N \times N_{Tx}}$, i.e., $$T = F_{N \times N}^{H}(\overline{X}^{(\iota)})^T = [t_0 \ldots t_{N_{Tx}-1}]. \quad (7)$$

In another specific embodiment, CP can be added to the time-domain composite signal T.

In another embodiment, prior to the transformation of frequency-domain signal $\overline{X}^{(\iota-1)}$ to the time-domain signal T, spectrum shaping via spectral precoder can be performed in frequency domain.

After transforming the composite frequency-domain signal matrix $\overline{X}^{(\iota)}$ to an auxiliary time-domain composite signal matrix T, the second sub-functionality $f^{CFR}(T; \gamma_{threshold}^{(\iota)})$ performs CFR on signal T per tx-branch independently, such that the post-CFR distorted time-domain signal per jth transmit branch reads $$u_j = f^{CFR}(t_j) = f^{FILT}(f^{CLIP}(t_j)), \text{ where } \{t_j, u_j\} \in X^{N \times 1}. \quad (8)$$

Here, $t_j$ is the jth column of T
  A basic form of clipping is polar clipping, where for each sample the phase is kept and the magnitude is set to $\gamma_{threshold}^{(\iota)}$ if it exceeds $\gamma_{threshold}^{(\iota)}$.
  In a specific embodiment, any distortion based (time-domain) clipping method can be employed (not limited to), e.g., clipping and filtering in time-domain, clipping in time-domain while filtering via FFT in frequency-domain, peak-cancellation, and so on.
  In another specific embodiment, the clipping technique can be iteration dependent.

In the third and last sub-functionality of CFR, the post-CFR time-domain signal matrix $U = \lfloor u_0 \ldots u_{N_{Tx}-1} \rfloor$ is transformed to the frequency-domain (OFDM de-modulation via FFT per transmit branch), i.e., the post-FFT signal matrix $\overline{Y}^{(\iota)} \in X^{N_{Tx} \times N}$ after CFR functionality/operation per transmit branch $\overline{Y}^{(\iota)} = (F_{N \times N} U)^T$.
  In another specific embodiment, if CP was added to the time-domain signal matrix T, then the CP should have been removed from the signal U, prior to the FFT rendering $\overline{Y}^{(\iota)}$.
  In case spectrum shaping is performed in the frequency domain, then the signal may already be available in the frequency domain from the preceding sub-step.
In one embodiment, it is possible to shape the spectrum prior to clipping because some clipping methods may filter the clipped-noise separately such that the effective clipped signal has the similar spectrum as to the input signal to the CFR.
Notice that the CFR iterations may be aligned to $N_{iter}$ iterations, i.e., it is not necessary to have internal sub-iterations within the CFR functionality.

In Step-3 of algorithm-1,
  if the distortion should not be precoded within a given iteration cycle ι, then $\overline{X}^{(\iota)} = \overline{Y}^{(\iota)}$ and go to Step-2.
  otherwise if distortion needs to be precoded within a given iteration ι, then Step-3 of algorithm-1 updates the distortions of the (composite) post-CFR signal corresponding to S20 in FIG. 4B by subtracting the ideal precoded signal matrix $\overline{S}$ from the post-CFR frequency-domain signal matrix $\overline{Y}^{(\iota)}$, i.e., $$\overline{Z}^{(\iota)} = \beta^{(\iota)}(\overline{Y}^{(\iota)} - \overline{S}), \quad (9)$$

where, $\beta^{(\iota)}$ is a real-valued single-scalar scaling factor to control the power of the distortion.
  In an alternative embodiment, the distortion update in (9) can be formed as $\overline{Z}^{(\iota)} = \beta^{(\iota)}(\overline{Y}^{(\iota)} - \overline{X}^{(\iota-1)})$
  In yet another embodiment, the distortion update can be performed in time-domain itself prior to OFDM demodulation (i.e., FFT), that can equivalently be shown as $$\overline{Z}^{(\iota)} = \beta^{(\iota)}(F_{N \times N}(U - F_{N \times N}^{H} \overline{S}))^T.$$

In a specific embodiment, the distortion scaling factor $\beta^{(\iota)}$ can be iteration and transmit antenna dependent.
  In another specific embodiment, the distortion scaling factor can be that $\beta^{(\iota)} > 1$ in order to accelerate the convergence towards the PAPR target in fewer iterations while penalizing the distortion power.

Step-4 corresponds to S30 and S40 in FIG. 4B, i.e., the step of precoding the determined distortions based on the previous embodiments corresponding to Step-3 of algorithm-1 (and S20 in FIG. 4B). The precoding function $\overline{X}^{(\iota)} = f^{PRECODING}(\overline{Z}^{(\iota)}; \overline{S}, \{C[k]\})$, which utilizes the latest updated distortion $\overline{Z}^{(\iota)}$, constructed/computed distortion precoding set $\{C[k]\}$ and the ideal precoding signal matrix $\overline{S}$, reads:

---
function $\overline{X}^{(\iota)} = f^{PRECODING}(\overline{Z}^{(\iota)}; \overline{S}, \{C[k]\})$:
1:     for all active subcarriers k do
2:        $\overline{z}^{(\iota)}[k] = C[k] z^{(\iota)}[k]$     %precoding distortion

| 3: | $\bar{x}^{(t)}[k] = \bar{s}[k] + \bar{z}^{(t)}[k]$ | %perturbing precoded distortion |
| 4: | end for | |

Here $\bar{z}^{(t)}[k]$, $z^{(t)}[k]$ and $\bar{x}^{(t)}[k]$ denote the kth column of $\bar{Z}^{(t)}$, $Z^{(t)}$ and $\bar{X}^{(t)}$ respectively.

The precoding function essentially precodes the latest updated distortion per sub-carrier or a group of sub-carriers as described in the previous embodiments according to the constructed distortion precoders' set $\{C[k] \in X^\perp\}$. The precoder functionality comprises two sub-functionalities, namely, precoding the distortions and perturbing the input signal

- Based on the constructed/determined set of the distortion precoders $\{C[k] \in X^\perp\}$ the distortion per sub-carrier or a group of sub-carriers is precoded, i.e., spatial shaping or linear transformation by the distortion precoder $\bar{z}^{(t)}[k] = C[k]\bar{z}^{(t)}[k]$.
- After precoding the distortions, the distortions are added or perturbed to the ideal precoded signal, i.e. $\bar{x}^{(t)}[k] = \bar{s}[k] + \bar{z}^{(t)}[k]$ rendering the updated composite signal $\bar{X}^{(t)}$.
- There are also embodiments where the precoded distortions are added to the composite signal generated in a previous iteration, i.e. $\bar{X}^{(t)} = f^{PRECODING}(Z^{(t)}; \bar{X}^{(t-1)}, \{C[k]\})$ After the elapse of the iteration cycles, Step-6 of the algorithm-1 corresponds to the step S50 of FIG. 4B, i.e., finally transmitting the updated composite signal $\bar{X}^{N_{iter}-1}$.

Figure 7:
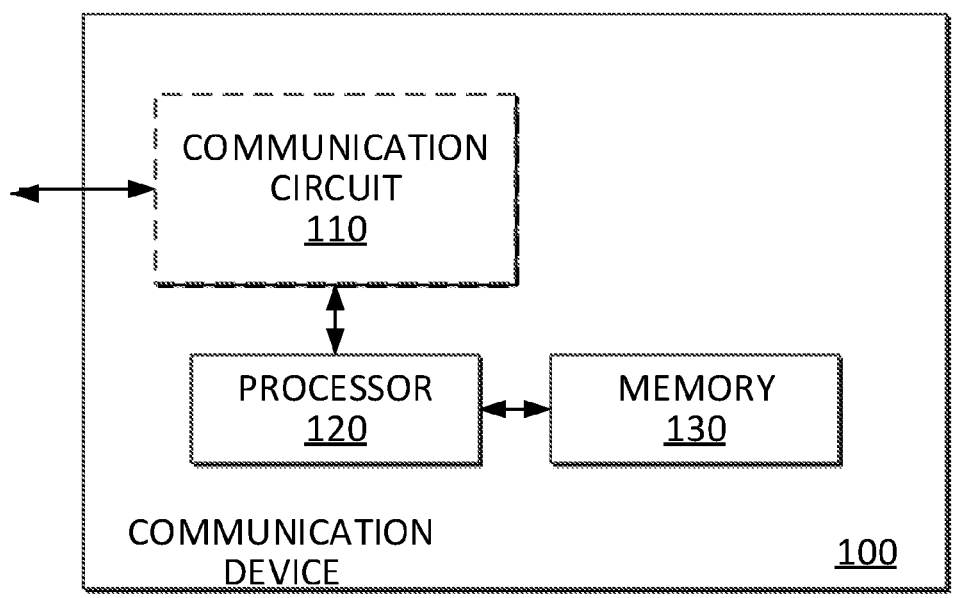
FIG. 7 illustrates an embodiment of a communication device according to the current disclosure.

With reference to FIG. 7, the proposed technology provides a communication device 100, which could be user equipment or a radio network node or similar including at least transmitter, wherein the communication device is configured to generated a signal for transmission for each transmitter, and to determine signal distortions of the generated signal to reduce the PAPR. Further, the communication device 100 is configured to precode the determined signal distortions and generate a composite signal based on the precoded signal distortions and the generated signal for transmission. Finally, the communication device 100 is configured to transmit the composite signal. According to a further embodiment, the communication device 100 is configured to perform the above mentioned steps together with or to provide PAPR and spectrum shaping.

In another embodiment, the communication device 100 is configured to iteratively perform the above described steps until a predetermined condition for the composite signal is fulfilled, e.g. that a certain PAPR is reached.

The communication device is further configured to perform the embodiments of the method as described in this disclosure.

The proposed technology may be applied to a user terminal, which may be a wired or wireless device, or to some other radio network node such as a radio base station or the like.

As used herein, the non-limiting terms "User Equipment" and "wireless device" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPad, customer premises equipment, CPE, laptop embedded equipment, LEE, laptop mounted equipment, LME, USB dongle, a portable electronic radio communication device, a sensor device equipped with radio communication capabilities or the like. In particular, the term "UE" and the term "wireless device" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

As used herein, the term "wired device" may refer to any device configured or prepared for wired connection to a network. In particular, the wired device may be at least some of the above devices, with or without radio communication capability, when configured for wired connection.

As used herein, the non-limiting term "radio network node" may refer to base stations, network control nodes such as network controllers, radio network controllers, base station controllers, and the like. In particular, the term "base station" may encompass different types of radio base stations including standardized base stations such as Node Bs, or evolved Node Bs, eNBs, and macro/micro/pico radio base stations, home base stations, also known as femto base stations, relay nodes, repeaters, radio access points, base transceiver stations, BTSs, and even radio control nodes controlling one or more Remote Radio Units, RRUs, or the like. In addition, as the functionality may be divided between different units e.g. between a digital unit and a radio unit.

Optionally, the communication device may also include communication circuitry. The communication circuitry may include functions for wired and/or wireless communication with other devices and/or network nodes in the network. In an example, the communication device may include radio circuitry for communication with one or more other nodes, including transmitting and/or receiving information. The communication circuitry may be interconnected to the processor and/or memory.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules, and/or blocks described herein may be implemented in hardware using any conventional technology, such as discrete circuit or integrated circuit technology, including both general-purpose electronic circuitry and application-specific circuitry.

Examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules, and/or 25 blocks described herein may be implemented in software such as a computer program for execution by suitable processing circuitry such as one or more processors or processing units.

Examples of processing circuitry includes, but is not limited to, one or more 30 microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

In a further example, the communication device 100 comprises a processor and a memory, which memory comprises instructions executable by the processor, whereby the communication device 100 is operative to generate a signal for transmission for each transmitter, determine signal distortions of said generated signals, pre-code said determined signal distortions. Further, the communication device is operative to generate a composite signal for transmission based on the pre-coded determined signal distortions and the generated signal for transmission, to provide a composite signal to be transmitted.

FIG. 7 is a schematic block diagram illustrating an example of a communication device 100, comprising at least one transmitter and comprising a processor 120 and an associated memory 130, in which the memory comprises instructions executable by the processor, whereby the processor is operative to generate a signal for transmission for each transmitter. determine signal distortions of the generated signal. Further the processor 120 is operative to pre-code the determined signal distortions, generate a composite signal for transmission based on the precoded determined signal distortions and the generated signal for transmission, to provide a composite signal.

According to a further embodiment the communication device comprises a communication circuitry configured to transmit the thus generated composite signal, to enable mitigating signal distortion impact in at least one receiving communication device or node.

Figure 8:
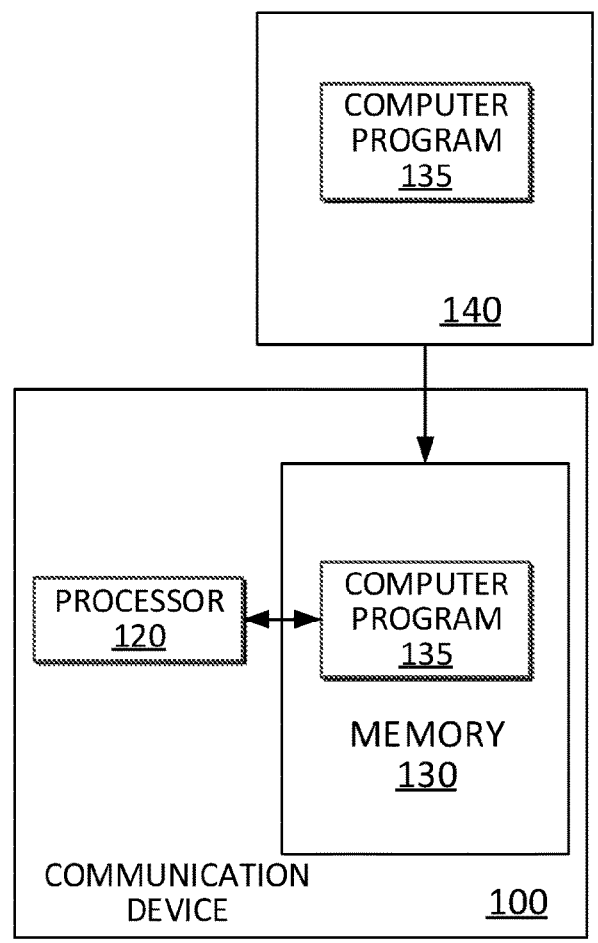
FIG. 8 illustrates an embodiment of a communication device according to the current disclosure.

In this particular example, with reference to FIG. 8, at least some of the steps, functions, procedures, modules and/or blocks described herein are implemented in a computer program 135, 140, which is loaded into the memory 130 for execution by processing circuitry including one or more processors 120. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure, and/or blocks, but may also execute other tasks. In a particular embodiment, the computer program comprises instructions, which when executed by at least one processor, cause the processor(s) to perform the steps of the method as described above.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program may be realized as a computer program product, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may therefore be regarded as a computer flow diagram or diagrams, when performed by one or more processors. A corresponding communication device may be defined as a group of function modules, where each step performed by the processor corresponds to a function module. In this case, the function modules are implemented as a computer program running on the processor. Hence, the communication device may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such function modules is illustrated in FIG. 9.

Figure 9:
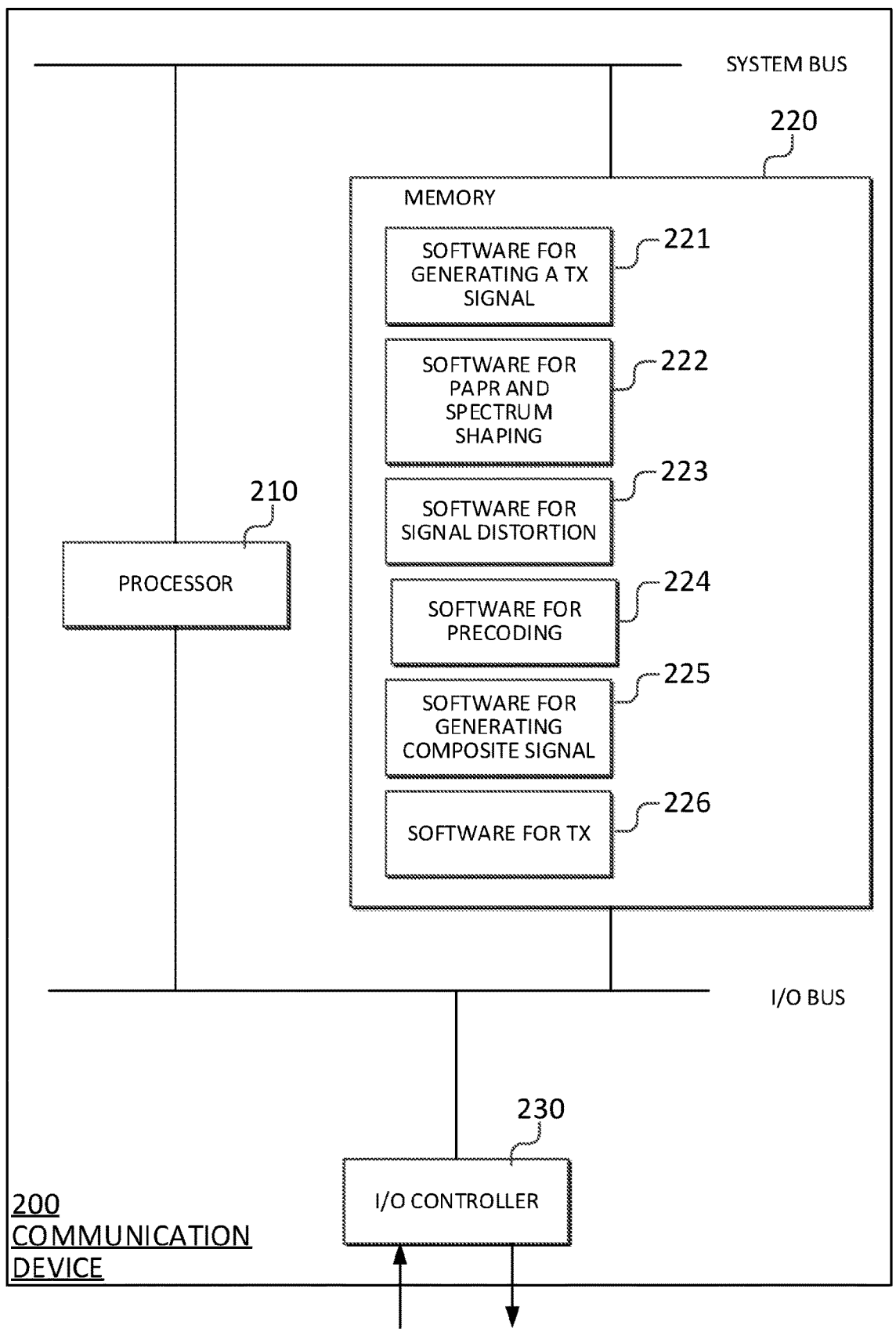
FIG. 9 illustrates an embodiment of a communication device according to the current disclosure.

FIG. 9 is a schematic block diagram illustrating an example of a communication device 200 comprising a processor 210, an associated memory 220, a group of function modules 221-226 configured to implement the method of the present disclosure. Further, the communication device includes an I/O controller 230, in addition to both an input bus and an I/O bus.

In this particular example, at least some of the steps, functions, procedures, modules, and/or blocks described herein are implemented in a computer program, which is loaded into the memory 220 for execution by processing circuitry including one or more processors 210. The processor(s) 210 and memory 220 are interconnected to each other to enable normal software execution. An optional input/output device 230 may also be interconnected to the processor(s) 210 and/or the memory 220 to enable input and/or output of relevant data such as input parameter(s) and/or resulting output parameter(s). In the current embodiments, the input parameters may comprise the coupled and cross coupled signals, and the output parameters may comprise the calibrated antenna signals.

Consequently, the software modules or functional modules 221-226 are configured to perform the steps of the method as described above. In particular the communication device 200 includes a module 221 for generating a signal for transmission for each transmitter, a module 223 for determining signal distortions of the generated signal. Further the communication device 200 includes a module 224 for pre-coding the determined signal distortions, as well as a module 225 for generating a composite signal for transmission based on the precoded determined signal distortions and the generated signal for transmission, to provide a composite signal. Further, the communication device 200 includes a module 226 for transmitting said composite signal, to enable mitigating signal distortion impact in at least one receiving communicating device or node.

In recent years with the introduction of high number of spatial layers and high order modulation alphabets, there has been an increase in demand of digital radio transmitters with high modulation accuracy, i.e. low levels of distortions since they need high SNR at the receiver side to offer benefits. It is well-known that the or data rates of such system is limited by distortions in high SNR regime.

The proposed solution makes it possible to transmit high-rank (e.g., 8 spatial layers) beamformed data with large modulation alphabet (e.g., 256QAM) in order to maximize the spectral-efficiency of the massive MIMO systems. Previously, it would have been difficult to justify the added complexity of a digital solution of this nature due to distortion that anyway would have been added in the RF frontend. However, the current state-of-the-art of RF parts are so high performing in terms of low distortion levels, that the digital solution like the one described in this paper start to appear attractive.

The following advantages have been identified:
- The method allows PAPR reduction and spectrum shaping per transmitter while at the same time reducing the thereby introduced distortion at the receivers and consequently improving the user and cell throughput of massive/large MIMO OFDM systems
- Does not require the DL channel knowledge at the transmitter, merely knowledge about the precoding weights used for the signals transmitted and is hence applicable to a large number of different precoding techniques such as codebook feedback based and reciprocity based schemes.

This disclosure is related to spatial shaping of the distortions in a digital radio transmitter for the crest-factor reduction (CFR) of (massive) MIMO-OFDM systems, by means of precoding, such that the distortions at the receiver(s) are mitigated. The teachings of the present disclosure are applicable to any multi-carrier and (large) MIMO based standards, e.g., LTE/LTE-A, WiFi, WiMax, as well as 5G systems based on OFDM with massive MIMO or AAS.

The embodiments described above are merely given as examples, and it should be understood that the proposed technology is not limited thereto. It will be understood by those skilled in the art that various modifications, combinations, and changes may be made to the embodiments without departing from the present scope as defined by the appended claims. In particular, different part solutions in the different embodiments can be combined in other configurations, where technically possible.

REFERENCES

[1] C. Studer and E. G. Larsson, "PAR-Aware Large-Scale Multi-User MIMO-OFDM Downlink," IEEE Journal on Selected Areas in Communications, Vol. 31, No. 2, pp. 303-313, February 2013.
[2] H. Bao et al., "Perturbation-Assisted PAPR Reduction for Large-Scale MIMO-OFDM Systems via ADMM," arXiv:1607.02681v1 [cs.IT], 10 Jul. 2016.
[3] Ali H. Sayed, "Adaptive Filters," John Wiley & Sons, 2008.
[4] S. Boyd and L. Vanderberghe, "Convex Optimization," Cambridge University Press, 2004.
[5] S. Boyd et al., "Distributed optimization and statistical learning via the alternating direction method of multipliers," Foundations and Trends in Machine Learning, Vol. 3, No. 1, pp. 1-122, 2011.
[6] I. S. Dhillon et al., "Constructing packings in Grassmannian manifolds via alternating projection," Experimental mathematics, Vol. 17, No. 1, pp. 9-35, 2008.
[7] J. Song and H. Ochiai, "Performance Analysis for OFDM Signals With Peak Cancellation," IEEE Transactions on Communications, Vol. 64, No. 1, pp. 261-270, January 2016.
[8] J. Van De Beek, "Sculpting the Multicarrier Spectrum: A Novel Projection Precoder," IEEE Communications Letters, Vol. 13, No. 12, pp. 881-883, December 2009.
[9] D. Dardari, V. Tralli, and A. Vaccari, "A theoretical characterization of nonlinear distortion effects in OFDM systems," in IEEE Transactions on Communications, Vol. 48, No. 10, pp. 1755-1764, October 2000.
[10] Ye Ke, and L.-H. Lim, "Schubert varieties and distances between subspaces of different dimensions," in SIAM Journal on Matrix Analysis and Applications, Vol. 37, No. 3, pp. 1176-1197, September 2016.

The invention claimed is:

1. A method for signal distortion mitigation in a communication device with at least two transmitters in a communication system, said method comprising:
generating a signal for transmission for each transmitter of the at least two transmitters;
performing Peak-to-Average Power Ratio (PAPR) reduction and spectrum shaping of each of said generated signal to provide distorted signals for transmission;
determining signal distortions of said distorted signals, wherein the determining the signal distortions comprises determining a difference between said generated signal for each transmitter of the at least two transmitters and a reference signal;
precoding said determined signal distortions;
generating a composite signal for transmission based on said precoded determined signal distortions and said generated signal for transmission for each transmitter of the at least two transmitters, to provide a composite signal, and
transmitting said composite signal, wherein the precoding mitigates the signal distortions.

2. The method according to claim 1, wherein each of said generated signal is an OFDM signal and said determining further comprises determining frequency domain signal distortions for each of said OFDM signal and said precoding comprises precoding in a frequency domain.

3. The method according to claim 1, comprising iterating one or more of said performing PAPR reduction and spectrum shaping, precoding, and generating said composite signal until a predetermined condition for said composite signal is fulfilled.

4. The method according to claim 1, comprising iterating one or more of said performing PAPR reduction and spectrum shaping and generating said composite signal until a predetermined condition for said composite signal is fulfilled.

5. The method according to claim 1, wherein said reference signal is a distortion free signal.

6. The method according to claim 1, wherein said precoding is based on precoder matrices used for the transmission of the signals.

7. The method according to claim 1, wherein said precoding is based on a random selection from a set of Multiple-Input Multiple-Output (MIMO) precoders.

8. The method according to claim 7, wherein said set of MIMO precoders is determined as a function of precoder matrices used for the transmission of the signals.

9. The method according to claim 7, wherein said precoding is based on said random selection from the set of MIMO precoders as a function of a subcarrier index/number.

10. The method according claim 7, wherein MIMO precoders are selected to have low inner products with the MIMO precoders used for the signals to be transmitted, in which a subcarrier index is used to select a MIMO precoder from a set of MIMO precoders with sufficiently low inner products.

11. The method according to claim 10, wherein selected MIMO precoders are different for different subcarriers or groups of subcarriers.

12. The method according to claim 1, wherein said precoding is based on a feedback request from a user equipment, said feedback comprising one or several precoder/beam indices such that a beam energy at a user equipment is minimized, below a certain threshold related to an index minimizing the beam energy.

13. A communication device comprising at least two transmitters, said communication device comprising:
   a processor; and
   a memory comprising instructions which, when executed by the processor, cause the communication device to:
      generate a signal for transmission for each transmitter of the at least two transmitters;
      perform Peak-to-Average Power Ratio (PAPR) reduction and spectrum shaping of each of said generated signal to provide distorted signals for transmission;
      determine signal distortions of said distorted signals, wherein to determine the signal distortions comprises to determine a difference between said generated signal for each transmitter of the at least two transmitters and a reference signal;
      precode said determined signal distortions;
      generate a composite signal for transmission based on said precoded determined signal distortions and said generated signal for transmission for each transmitter of the at least two transmitters, to provide a composite signal, and
      transmit said composite signal, to enable signal distortion mitigation, wherein the precoding enables mitigating the signal distortions.

14. The communication device according to claim 13 further configured to repeat one or more of said PAPR reduction and spectrum shaping, precode, and generate said composite signal until a predetermined condition for said composite signal is fulfilled.

15. The communication device of claim 13 further comprising communication circuitry configured to transmit said composite signal, to enable mitigating the signal distortions impacting at least one receiving communication device.

16. A non-transitory machine readable storage medium comprising instructions which, when executed by at least one processor, are capable of causing a communication device to perform operations to mitigate signal distortions comprising:
   generating a signal for transmission for each transmitter of at least two transmitters;
   perform Peak-to-Average Power Ratio (PAPR) reduction and spectrum shaping of each of said generated signal to provide distorted signals for transmission;
   determine signal distortions of said distorted signals, wherein the determining the signal distortions comprises determining a difference between said generated signal for each transmitter of the at least two transmitters and a reference signal;
   precode said determined signal distortions;
   generate a composite signal for transmission based on said precoded determined signal distortions and said generated signal for transmission for each transmitter of the at least two transmitters, to provide a composite signal, and
   transmit said composite signal, to enable signal distortion mitigation.

* * * * *

UNITED STATES PATENT AND TRADEMARK OFFICE
CERTIFICATE OF CORRECTION

PATENT NO. : 11,128,507 B2
APPLICATION NO. : 16/484785
DATED : September 21, 2021
INVENTOR(S) : Kant et al.

It is certified that error appears in the above-identified patent and that said Letters Patent is hereby corrected as shown below:

In the Specification

In Column 2, Lines 20-21, delete "signal-to-interference-and-noise ratio (SINR)" and insert -- signal-to-interference-plus-noise ratio (SINR) --, therefor.

In Column 4, Line 55, delete "RX RECEIVER/RECEIVER" and insert -- RX RECEIVE/RECEIVER --, therefor.

In Column 4, Lines 56-57, delete "SINR SIGNAL TO INTERFERENCE AND NOISE POWER RATIO" and insert -- SINR SIGNAL-TO-INTERFERENCE-PLUS-NOISE RATIO --, therefor.

In Column 4, Line 58, delete "SNR SIGNAL TO NOISE POWER RATIO" and insert -- SNR SIGNAL-TO-NOISE RATIO --, therefor.

In Column 5, Line 34, delete "signal to interference and noise ratio," and insert -- signal-to-interference-plus-noise ratio, --, therefor.

In Column 5, Line 50, delete "The $N_T$)," and insert -- The $N_{Tx}$, --, therefor.

In Column 6, Line 17, delete "M IMO-precoders" and insert -- MIMO-precoders --, therefor.

In Column 10, Line 40, delete "$W[k] \in X^{N_{Tx} \times N_{ss}}$," and insert -- $W[k] \in X^{N_{Tx} \times N_{ss}}$ --, therefor.

In Column 12, Line 7, delete "subcarrier are" and insert -- subcarrier k are --, therefor.

In Column 12, Line 7, delete "$C[k]\alpha P_{W[k]}^\perp + (1-\alpha)P_{W[k]}$" and insert -- $C[k]=\alpha P_{W[k]}^\perp + (1-\alpha)P_{W[k]}$ --, therefor.

In Column 12, Lines 10-11, delete "$P_{W[k]}=w[k](W^H[k]W[k])^{-1} W^H[k]$" and insert Signed and Sealed this
Tenth Day of May, 2022

Katherine Kelly Vidal
*Director of the United States Patent and Trademark Office*

-- $P_{W[k]}=W[k](W^H[k]W[k])^{-1} W^H[k]$ --, therefor.

In Column 12, Line 50, delete "w[k]," and insert -- W[k], --, therefor.

In Column 12, Line 52, in Equation (5), delete "$\Pi_W^\perp=\{p: c/(W[k],\tilde{W}_p)\geq\delta\};W[k],\{\tilde{W}_p\}\in X$," and insert -- $\Pi_W^\perp=\{p: d(W[k],\tilde{W}_p)\geq\delta\};W[k],\{\tilde{W}_p\}\in X$, --, therefor.

In Column 12, Line 62, delete "$\Pi_W^\perp$, i.e., $|\Pi_W^\perp=1$," and insert -- $\Pi_W^\perp$, i.e., $|\Pi_W^\perp|=1$, --, therefor.

In Column 13, Line 20, delete "d(W[k], $\tilde{W}_p$)=COS$^{-1}$(|det($\tilde{W}_p^H$W[k])|)." and insert -- $d(\mathbf{W}[k], \tilde{\mathbf{W}}_p) = \cos^{-1}(|\det(\tilde{\mathbf{W}}_p^H \mathbf{W}[k])|)$ --, therefor.

In Column 13, Line 24, delete "$\tilde{\mathbf{W}}_p) = \text{trac}\{I_{N_{Tx}} - W[k](W^H[k]W[k])^{-1}W^H[k]\tilde{\mathbf{W}}_p$" and insert -- $\tilde{\mathbf{W}}_p) = \text{trace}\{I_{N_{Tx}} - W[k](W^H[k]W[k])^{-1}W^H[k]\tilde{\mathbf{W}}_p$ --, therefor.

In Column 16, Line 27, delete "$\bar{X}^{(i)}=Y^{(i)}$" and insert -- $\bar{X}^{(i)}=\bar{Y}^{(i)}$ --, therefor.

In Column 16, Line 35, in Equation (9), delete "$Z^{(i)}=\beta^{(i)}(\bar{Y}^{(i)}|\bar{S})$," and insert -- $Z^{(i)}=\beta^{(i)}(\bar{Y}^{(i)}-\bar{S})$, --, therefor.

In Column 16, Line 59, delete "$\bar{X}^{(i)}=f^{PRECODING}(z^{(i)}; \bar{s}, \{C[k]\})$," and insert -- $\bar{X}^{(i)}=f^{PRECODING}(z^{(i)}; \bar{s}, \{C[k]\})$, --, therefor.

In Column 17, Line 34, delete "$\bar{X}^{(N_{iter}-1)}$." and insert -- $\bar{X}^{(N_{iter}-1)}$.--, therefor.

In Column 18, Line 59, delete "and/or 25 blocks" and insert -- and/or blocks --, therefor.

In Column 18, Line 64, delete "more 30 microprocessors," and insert -- more microprocessors, --, therefor.

In Column 21, Line 6, delete "the or data rates" and insert -- the data rates --, therefor.

In the Claims

In Column 23, Line 4, in Claim 10, delete "The method according claim" and insert -- The method according to claim --, therefor.